(12) United States Patent
Kneckt et al.

(10) Patent No.: US 9,294,883 B2
(45) Date of Patent: *Mar. 22, 2016

(54) METHOD, APPARATUS, AND COMPUTER PROGRAM PRODUCT FOR PROBE REQUEST AND RESPONSE EXCHANGE

(75) Inventors: Jarkko Lauri Sakari Kneckt, Espoo (FI); Olli Petteri Alanen, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 554 days.

This patent is subject to a terminal disclaimer.

(21) Appl. No.: 13/409,404

(22) Filed: Mar. 1, 2012

(65) Prior Publication Data
US 2013/0231151 A1    Sep. 5, 2013

(51) Int. Cl.
| | |
|---|---|
| *H04W 40/24* | (2009.01) |
| *H04W 4/06* | (2009.01) |
| *H04L 29/06* | (2006.01) |
| *H04W 52/02* | (2009.01) |
| *H04W 48/08* | (2009.01) |
| *H04W 8/00* | (2009.01) |

(52) U.S. Cl.
CPC .............. *H04W 4/06* (2013.01); *H04L 69/22* (2013.01); *H04W 40/246* (2013.01); *H04W 52/0216* (2013.01); *H04W 8/005* (2013.01); *H04W 48/08* (2013.01)

(58) Field of Classification Search
CPC ... H04W 48/08; H04W 40/246; H04W 48/16; H04W 4/06; H04W 8/005; H04W 8/30
See application file for complete search history.

(56) References Cited

U.S. PATENT DOCUMENTS

| | | | |
|---|---|---|---|
| 7,480,264 B1 | 1/2009 | Duo et al. | |
| 2005/0047371 A1* | 3/2005 | Bennett | 370/331 |
| 2006/0057964 A1* | 3/2006 | Roy et al. | 455/67.11 |
| 2007/0002884 A1* | 1/2007 | Jaakkola et al. | 370/431 |
| 2007/0072638 A1* | 3/2007 | Yang et al. | 455/522 |
| 2008/0198826 A1 | 8/2008 | Won | |
| 2008/0205358 A1* | 8/2008 | Jokela | 370/338 |
| 2009/0252129 A1* | 10/2009 | Jaakkola | 370/338 |

(Continued)

FOREIGN PATENT DOCUMENTS

| | | |
|---|---|---|
| EP | 2034751 | 3/2009 |
| WO | WO 2006116951 | 9/2006 |

(Continued)

OTHER PUBLICATIONS

International Search Report for International Application No. PCT/F2013/050156 mail dated May 14, 2013.
Marc Emmelmann, et al., "Network Selection Optimization", Date: Jul. 20, 2011, IEEE 802.11-11/1015r1, 12 Slides.
Extended European Search Report for EP App. No. 13754176.9—Dated Oct. 7, 2015, 11 pages.

(Continued)

*Primary Examiner* — Fanghwa Wang
(74) *Attorney, Agent, or Firm* — Locke Lord LLP

(57) ABSTRACT

Method, apparatus, and computer program product embodiments of the invention are disclosed to improve the discovery of wireless networks. In example embodiments of the invention, a method comprises: transmitting a wireless message including at least one condition for response from one or more wireless devices, the condition for response including at least one of receive power of the wireless message at the one or more wireless devices, service level of the one or more wireless devices, or identity of the one or more wireless devices that can respond with a selected response; and receiving one or more responses from the one or more wireless devices that can satisfy the at least one condition.

21 Claims, 14 Drawing Sheets

(56) References Cited

U.S. PATENT DOCUMENTS

2010/0165875 A1* 7/2010 Kneckt et al. .................. 370/254
2010/0303051 A1* 12/2010 Umeuchi et al. .............. 370/338
2012/0188938 A1* 7/2012 Venkatraman et al. ....... 370/328

FOREIGN PATENT DOCUMENTS

| WO | WO 2008147130 | 4/2008 |
| WO | WO 2009035289 | 3/2009 |

OTHER PUBLICATIONS

Supplementary European Search Report for EP Application No. EP 13754176.9—1854/2820890 PCT/FI2013050156 dated Oct. 7, 2015.

M. Emmelmann; Optimised Networks Selection; 11-11-1015-01-00ai; IEEE-SA Mentor, Piscataway, NJ, USA, vol. 802.11ai, No. 1, Jul. 21, 2011; pp. 1-12; XP017674023.

* cited by examiner

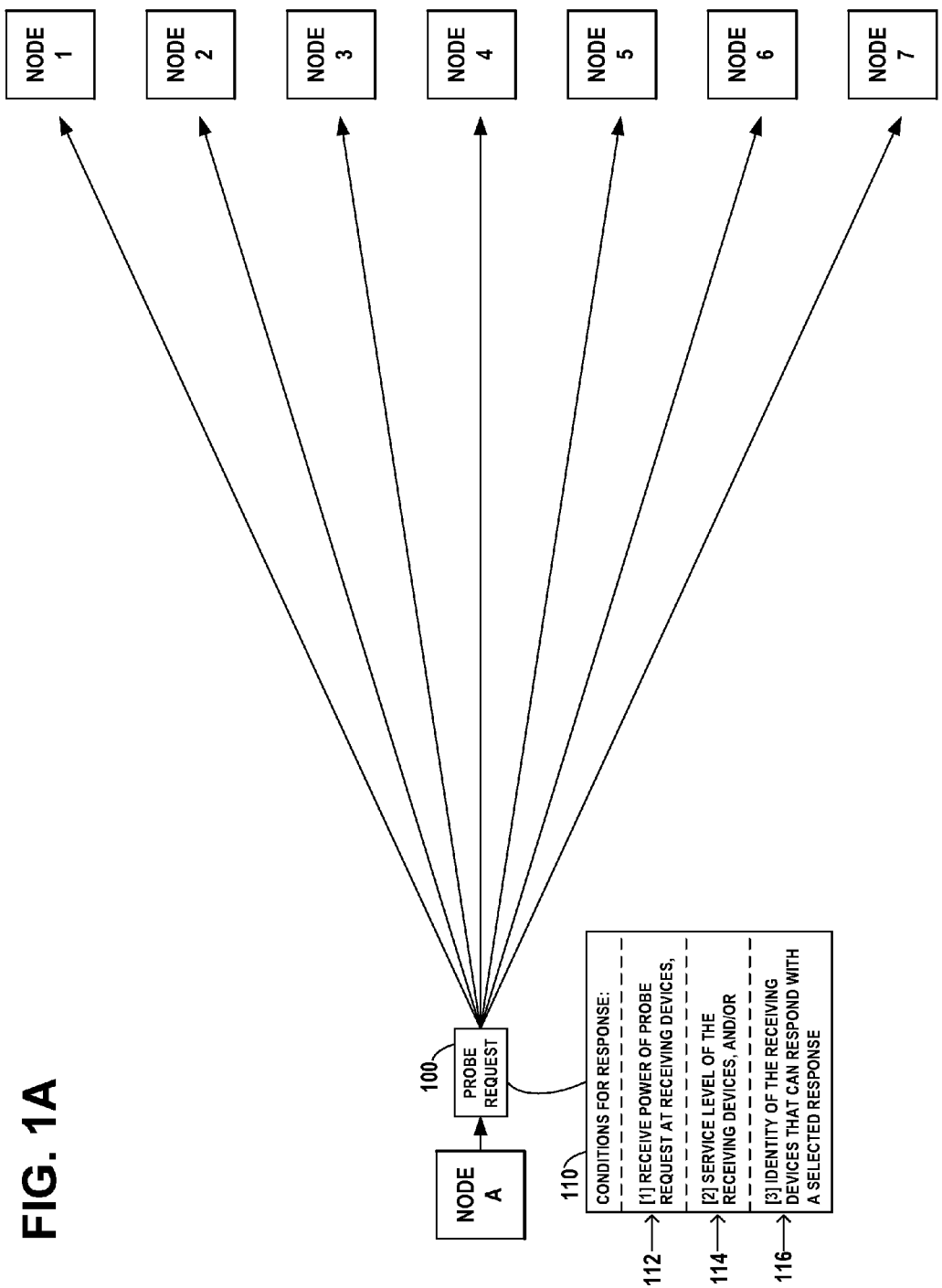

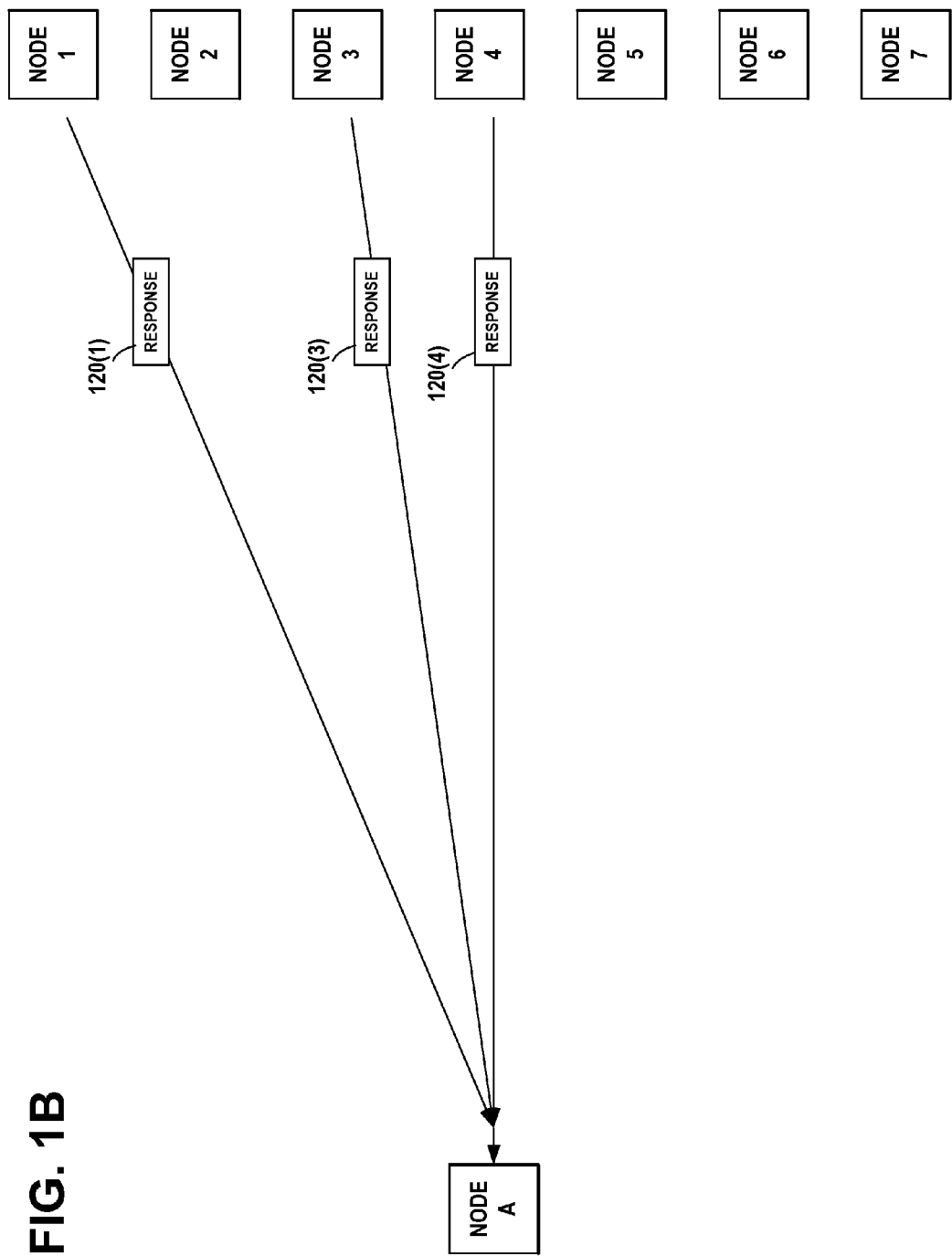

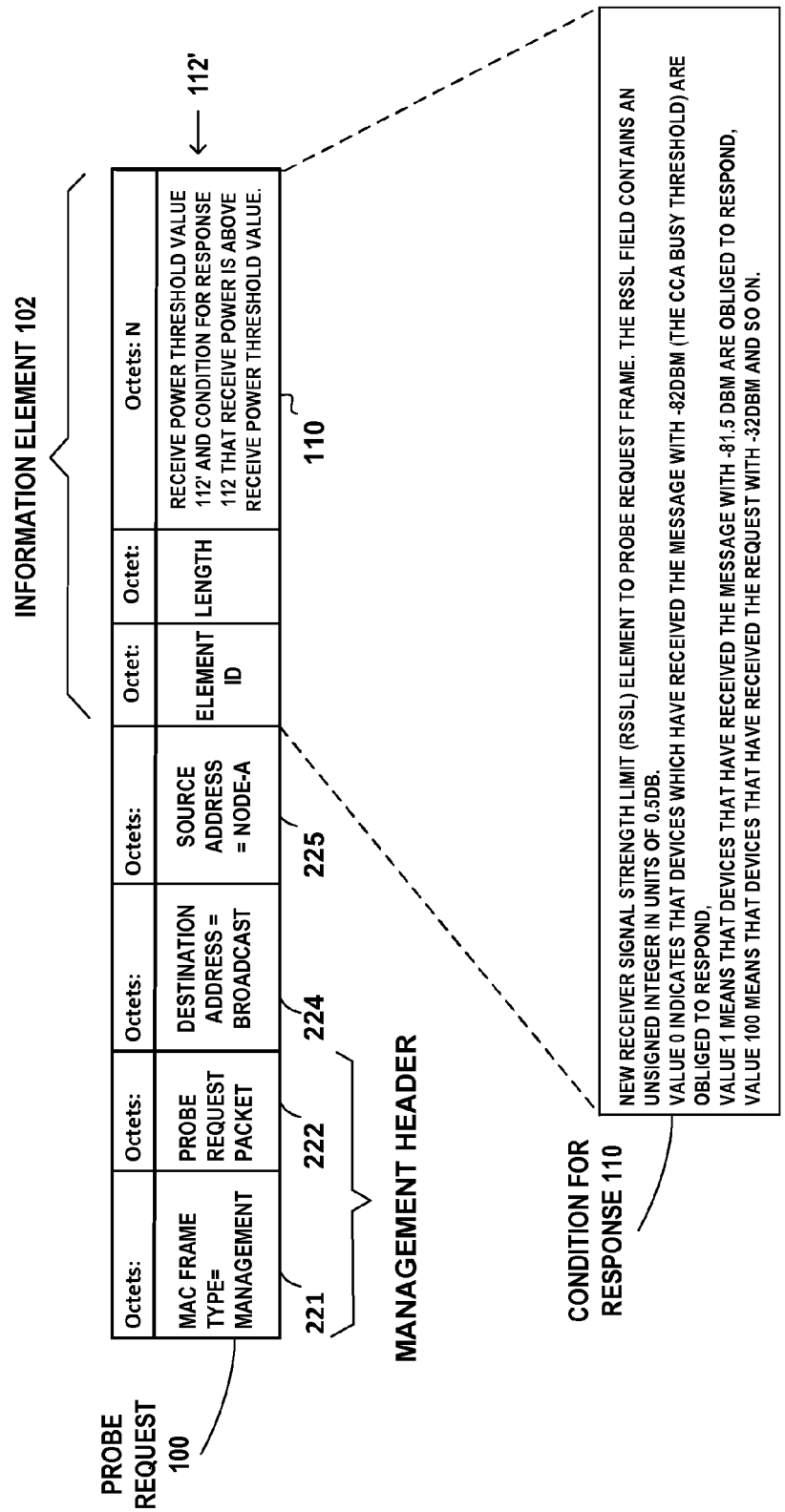

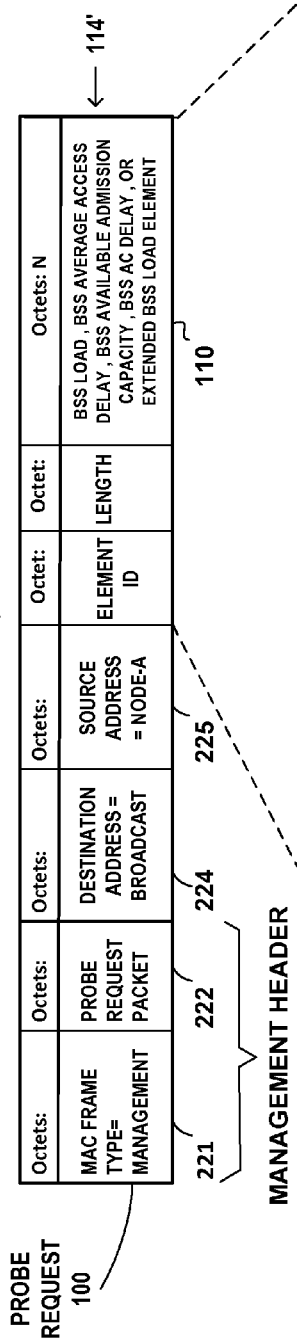

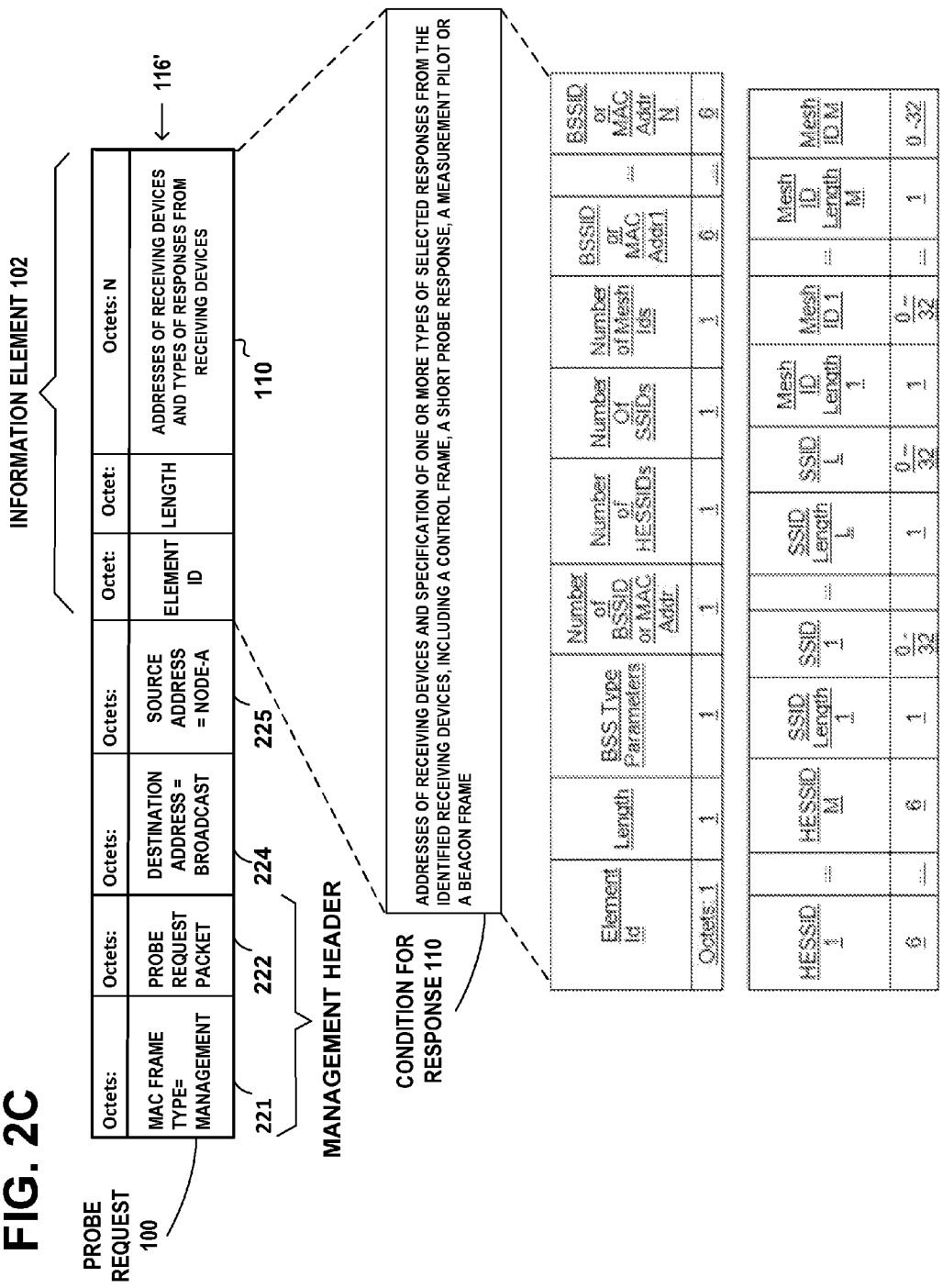

METHOD, APPARATUS, AND COMPUTER PROGRAM PRODUCT FOR PROBE REQUEST AND RESPONSE EXCHANGE

FIELD

The embodiments relate to wireless communication, and more particularly to improvements in discovering wireless networks.

BACKGROUND

Modern society has adopted, and is becoming reliant upon, wireless communication devices for various purposes, such as connecting users of the wireless communication devices with other users. Wireless communication devices can vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Short-range communication technologies provide communication solutions that avoid some of the problems seen in large cellular networks. Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra-high frequency radio frequency identification (UHF RFID) technologies. All of these wireless communication technologies have features and advantages that make them appropriate for various applications.

SUMMARY

Method, apparatus, and computer program product embodiments of the invention are disclosed to improve the discovery of wireless networks.

In an example embodiment of the invention, a method comprises:

transmitting a wireless message including at least one condition for response from one or more wireless devices, the condition for response including at least one of receive power of the wireless message at the one or more wireless devices, service level of the one or more wireless devices, or identity of the one or more wireless devices that can respond with a selected response; and receiving one or more responses from the one or more wireless devices that can satisfy the at least one condition.

In an example embodiment of the invention, the method further comprises:

wherein the wireless message is a probe request or a generic advertisement service request.

In an example embodiment of the invention, the method further comprises:

wherein the wireless message includes a receive power threshold value and the condition for response is that receive power of the wireless message at the one or more wireless devices is above the receive power threshold value.

In an example embodiment of the invention, the method further comprises:

wherein the wireless message includes one or more service level related threshold values including BSS Load threshold, BSS Average Access Delay threshold, BSS Available Admission Capacity threshold, BSS AC Delay threshold, or Extended BSS Load Element threshold and the condition for response is that the BSS Load, BSS Average Access Delay, BSS Available Admission Capacity, BSS AC Delay, or Extended BSS Load Element of the one or more wireless devices is below the respective threshold value.

In an example embodiment of the invention, the method further comprises:

wherein the wireless message includes a specification of one or more types of selected responses from the one or more identified wireless devices, including a control frame, a short probe response, a measurement pilot or a beacon frame.

In an example embodiment of the invention, the method further comprises:

wherein the wireless message is a first management frame and the one or more responses are second management frames.

In an example embodiment of the invention, the method further comprises:

wherein the wireless message is at least one of a broadcast message and a groupcast message.

In an example embodiment of the invention, the method further comprises:

wherein the one or more identified wireless devices are known from a location database.

In an example embodiment of the invention, the method further comprises:

wherein the one or more responses from the one or more wireless devices are forwarded by the one or more wireless devices to another wireless device.

In an example embodiment of the invention, the method further comprises:

receiving one or more types of selected responses from the one or more identified wireless devices, including a control frame, a short probe response, a measurement pilot or a beacon frame; and assessing a quality of a link to the one or more identified wireless devices using the received response.

In an example embodiment of the invention, an apparatus comprises:

at least one processor;

at least one memory including computer program code;

the at least one memory and the computer program code configured to, with the at least one processor, cause the apparatus at least to:

transmit a wireless message including at least one condition for response from one or more wireless devices, the condition for response including at least one of receive power of the wireless message at the one or more wireless devices, service level of the one or more wireless devices, or identity of the one or more wireless devices that can respond with a selected response; and receive one or more responses from the one or more wireless devices that can satisfy the at least one condition.

In an example embodiment of the invention, a computer program product comprising computer executable program code recorded on a computer readable, non-transitory storage medium, the computer executable program code, when executed by a computer processor, comprising:

code for transmitting a wireless message including at least one condition for response from one or more wireless devices, the condition for response including at least one of receive power of the wireless message at the one or more wireless devices, service level of the one or more wireless devices, or identity of the one or more wireless devices that can respond with a selected response; and code for receiving one or more responses from the one or more wireless devices that can satisfy the at least one condition.

In an example embodiment of the invention, a method comprises:

receiving by an apparatus, a wireless message from a sending device, including at least one condition for response from the apparatus, the condition for response including at least one of receive power of the wireless message at the apparatus, service level of the apparatus, or identity of the apparatus and that the apparatus can respond with a selected response; determining by the apparatus that it can satisfy the at least one condition; and transmitting a response by the apparatus.

In an example embodiment of the invention, the method further comprises:

wherein the wireless message is a probe request or a generic advertisement service request.

In an example embodiment of the invention, the method further comprises:

wherein the wireless message includes a receive power threshold value and the condition for response is that receive power of the wireless message at the apparatus is above the receive power threshold value; and determining by the apparatus that it can satisfy the at least one condition that the receive power of the wireless message at the apparatus is above the receive power threshold value.

In an example embodiment of the invention, the method further comprises:

wherein the wireless message includes one or more service level related threshold values including BSS Load threshold, BSS Average Access Delay threshold, BSS Available Admission Capacity threshold, BSS AC Delay threshold, or Extended BSS Load Element threshold and the condition for response is that the BSS Load, BSS Average Access Delay, BSS Available Admission Capacity, BSS AC Delay, or Extended BSS Load Element of the apparatus is below the respective threshold value; and determining by the apparatus that it can satisfy the at least one condition that the apparatus is below the respective threshold value.

In an example embodiment of the invention, the method further comprises:

wherein the wireless message includes a specification of one or more types of selected responses from the apparatus, including a control frame, a short probe response, a measurement pilot or a beacon frame; and determining by the apparatus that it can satisfy the at least one condition that the apparatus has the specified identity and that the apparatus can respond with the selected response.

In an example embodiment of the invention, the method further comprises:

forwarding the response to another wireless device.

In an example embodiment of the invention, an apparatus comprises:

at least one processor;

at least one memory including computer program code;

the at least one memory and the computer program code configured to, with the at least one processor, cause the apparatus at least to:

receiving by an apparatus, a wireless message from a sending device, including at least one condition for response from the apparatus, the condition for response including at least one of receive power of the wireless message at the apparatus, service level of the apparatus, or identity of the apparatus and that the apparatus can respond with a selected response;

determining by the apparatus that it can satisfy the at least one condition; and transmitting a response by the apparatus.

In an example embodiment of the invention, the apparatus further comprises:

wherein the response is transmitted as an omnidirectional transmission.

In an example embodiment of the invention, a computer program product comprising computer executable program code recorded on a computer readable, non-transitory storage medium, the computer executable program code, when executed by a computer processor, comprising:

code for receiving by an apparatus, a wireless message from a sending device, including at least one condition for response from the apparatus, the condition for response including at least one of receive power of the wireless message at the apparatus, service level of the apparatus, or identity of the apparatus and that the apparatus can respond with a selected response;

code for determining by the apparatus that it can satisfy the at least one condition; and code for transmitting a response by the apparatus.

In this manner, embodiments of the invention improve the discovery of wireless networks.

DESCRIPTION OF THE FIGURES

FIG. 1A illustrates an example wireless network diagram of a sending wireless node broadcasting a probe request with conditions for response to a plurality of seven receiving wireless nodes, in accordance with example embodiments of the invention.

FIG. 1B illustrates the example wireless network diagram of FIG. 1A, of three receiving wireless nodes having satisfied the conditions for response, replying to the probe request with a response with their respective discovery data, in accordance with an example embodiment of the invention.

FIG. 2A illustrates an example of the wireless message, such as a probe request frame, which includes the receive power of the probe request at the receiving devices, as the condition for response, in accordance with an example embodiment of the invention.

FIG. 2B illustrates an example of the wireless message, such as a probe request frame, which includes the service level of the receiving devices, as the condition for response, in accordance with an example embodiment of the invention.

FIG. 2C illustrates an example of the wireless message, such as a probe request frame, which includes the identity of the receiving devices that can respond with a selected response, as the condition for response, in accordance with an example embodiment of the invention.

DISCUSSION OF EXAMPLE EMBODIMENTS OF THE INVENTION

Figure 2:
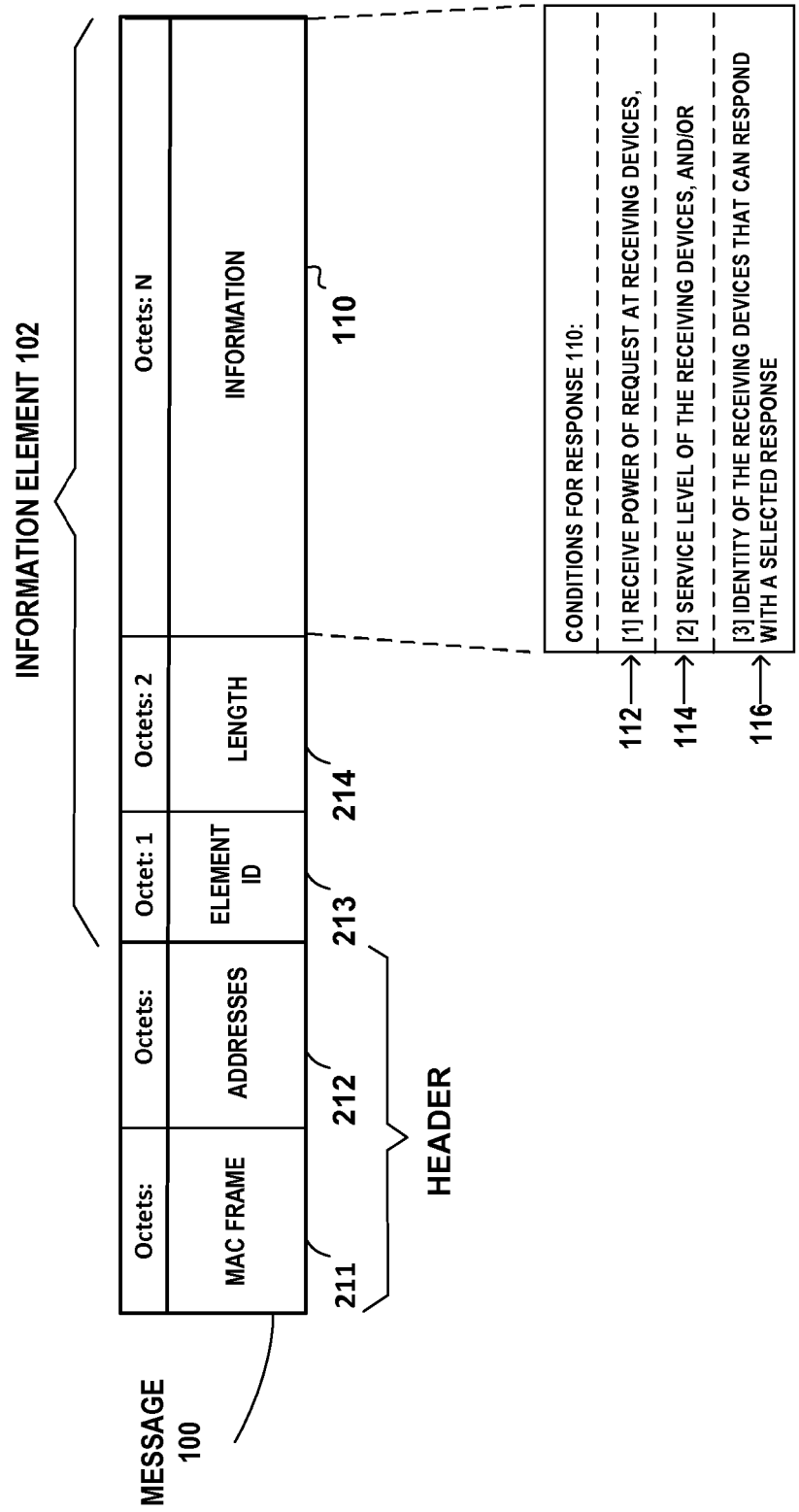
FIG. 2 illustrates an example of the wireless message broadcast by the sending wireless node, as a generalized frame body that includes an information element with conditions for response, in accordance with an example embodiment of the invention.

This section is organized into the following topics:
A. WLAN Communication Technology
　1. IEEE 802.11 MAC Frames and Information Elements
　2. IEEE 802.11 Beacon, Probe Request and Response
　3. Generic Advertisement Service (GAS)
　4. Wi-Fi Direct—Software Access Points
B. Probe Request and Response Exchange
A. WLAN Communication Technology An example wireless network, such as a Wireless Local Area Network (WLAN) may be organized as an independent basic service set (IBSS), mesh basic service set (MBSS) or an infrastructure basic service set (BSS). Wireless devices in an independent basic service set (IBSS) communicate directly with one another and there is no access point (AP) in the IBSS. A mesh basic service set (MBSS) consists of autonomous wireless devices that establish peer-to-peer wireless links that provide means for multi-hop communication. An infrastructure basic service set (BSS) includes a wireless access point that may be connected to one or more servers and peripheral devices by a wired backbone connection. In an infrastructure BSS, the access point is a central hub to which mobile wireless devices are wirelessly connected. The mobile wireless devices typically do not communicate directly with one another, but communicate indirectly through the access point. An access point may be connected to other access points by a wired backbone connection in an extended service set (ESS). Mobile wireless devices may roam from one wireless connection with one access point to a second wireless connection with a second access point in the ESS, and still be linked to the first access point in the ESS via the wired backbone connection.

The IEEE 802.11 standard specifies methods and techniques of wireless local area network (WLAN) operation. Examples include the IEEE 802.11b and 802.11g wireless local area network specifications, which have been a staple technology for traditional WLAN applications in the 2.4 GHz ISM band. The various amendments to the IEEE 802.11 standard were consolidated for IEEE 802.11a, b, d, e, g, h, i, j protocols, into the base standard *IEEE 802.11-2007, Wireless Medium Access Control (MAC) and Physical Layer (PHY) Specifications*, June 2007 (incorporated herein by reference). Since then, emerging broadband applications have stimulated interest in developing very high-speed wireless networks for short range communication, for example, the IEEE 802.11n, the planned IEEE 802.11ac, and the planned IEEE 802.11ad WLAN specifications that are to provide a very high throughput in higher frequency bands. Applications of these IEEE 802.11 standards include products such as consumer electronics, telephones, personal computers, and access points for both for home and office.

According to an example embodiment, wireless local area networks (WLANs) typically operate in unlicensed bands. IEEE 802.11b and 802.11g WLANs have been a staple technology for traditional WLAN applications in the 2.4 GHz ISM band and have a nominal range of 100 meters. The IEEE 802.11 ah WLAN standard is being developed for operation in the 900 MHz ISM band and will have a greater range and lower obstruction losses due to its longer wavelength.

1. IEEE 802.11 MAC Frames and Information Elements

There are three major types of medium access control (MAC) frames in the IEEE 802.11 protocol: the management frame, the control frame, and the data frame. Management frames provide management services. Data frames carry payload data. Control frames assist in the delivery of data frames. Each of these types of MAC frame consists of a MAC header, a frame body, and a frame check sequence (FCS). The header contains control information used for defining the type of 802.11 MAC frame and providing information necessary to process the MAC frame. The frame body contains the data or information included in either management type or data type frames. The frame check sequence is a value representing a cyclic redundancy check (CRC) over all the fields of the MAC header and the frame body field.

Management frames are used to provide management services that may be specified by variable-length fields called information elements included in the MAC frame body. An information element includes three fields: its function is identified by an element ID field, its size is provided by a length field, and the information to deliver to the recipient is provided in a variable-length information field.

2. IEEE 802.11 Beacon, Probe Request and Response a. Beacon

The beacon frame is a management frame that is transmitted periodically to allow wireless devices to locate and identify a network. The beacon frame includes the fields: timestamp, beacon interval, and capability information. The timestamp contains the value of the device's synchronization timer at the time that the frame was transmitted. The capability information field is a 16-bit field that identifies the capabilities of the device. The information elements in a beacon frame are the service set identifier (SSID), the supported rates, one or more physical parameter sets, an optional contention-free parameter set, and an optional traffic indication map.

i. Infrastructure BSS Networks with an Access Point

In an infrastructure BSS networks with an Access Point, beacon frames are used for enabling wireless devices to establish and maintain orderly communications. The beacon frames are transmitted by the Access Points at regular intervals and include a frame header and a body with various information, including a SSID identifying the name of a specific WLAN and a beacon interval specifying the intended time interval between two beacon transmissions. One purpose of the beacon frames is to inform the wireless devices about the presence of an Access Point in the area. The access point in an infrastructure BSS IEEE 802.11 WLAN network, may be a central hub that relays all communication between the mobile wireless devices (STAs) in an infrastructure BSS. If a STA in an infrastructure BSS wishes to communicate a frame of data to a second STA, the communication may take two hops. First, the originating STA may transfer the frame to the AP. Second, the AP may transfer the frame to the second STA. In an infrastructure BSS, the AP may transmit beacons or respond to probes received from STAs. After a possible authentication of a STA that may be conducted by the AP, an association may occur between the AP and a STA enabling data traffic to be exchanged with the AP. The Access Point in an Infrastructure BSS may bridge traffic out of the BSS onto a distribution network. STAs that are members of the BSS may exchange packets with the AP.

ii. Ad Hoc IBSS Networks

The first ad hoc wireless device to become active establishes an IBSS and starts sending beacons to inform the other wireless devices about the presence of an ad hoc network in the area. Other ad hoc wireless devices may join the network after receiving a beacon and accepting the IBSS parameters, such as the beacon interval, found in the beacon frame.

Each wireless device that joins the ad hoc network may send a beacon periodically if it doesn't hear a beacon from another device within a short random delay period after the beacon is supposed to be sent. If a wireless device doesn't hear a beacon within the random delay period, then the wireless device assumes that no other wireless devices are active in the ad hoc network and a beacon needs to be sent.

A beacon signal is periodically transmitted from the ad hoc network. The beacon frame is transmitted periodically and includes the address of the sending device.

b. Probe Request

The probe request frame is a management frame that is transmitted by a wireless device attempting to quickly locate a wireless local area network (LAN). It may be used to locate independent basic service sets (IBSSs), infrastructure basic service sets (BSSs) or mesh basic service sets (MBSSs) only or any of them. It may be used to locate a wireless LAN with a particular SSID or to locate any wireless LAN. The probe request frame may contain a service attribute request.

For active scans, the wireless device either broadcasts or unicasts a probe request on the channel it is scanning. It may set the SSID in the probe request to a wildcard SSID or to a specific SSID value. It may set the BSSID in the probe request a wildcard BSSID or to a specific BSSID value. With these options the wireless device can look for any SSID or BSSID, any representative of a specific SSID or a specific BSSID. The wireless device will add any received beacons or probe responses to a cached BSSID scan list. For passive scans, the wireless device does not send a probe request, but instead, listens on a channel for a period of time and adds any received beacons or probe responses to its cached BSSID scan list. The wireless device may scan both infrastructure and ad hoc networks, regardless of the current setting of its network mode. The wireless device may use either the active or passive scanning methods, or a combination of both scanning methods. The wireless device performs the scan across all the frequency channels and bands that it supports.

i. Infrastructure BSS Networks with an Access Point

The wireless device may transmit a probe request and receive a probe response from the access point in the BSS. The probe request is transmitted by a wireless device to obtain information from another station or access point. For example, a wireless device may transmit a probe request to determine whether a certain access point is available. In the infrastructure BSS, only the AP responds to probe requests. The probe response sent back by the AP contains a timestamp, beacon interval, and capability information. It also includes the SSID of the BSS, supported rates, and PHY parameters. The wireless device STA may learn that the access point AP will accept the STA's credentials.

Exemplary rules applied by the scanning wireless device (i.e. scanner) and the APs with active scanning are as follows:

1) Scanner (for each channel to be scanned):
   a. ProbeTimer is set before transmission of probe request. During the probe timer the scanning device tries to obtain a transmission from the media in order to obtain NAV information. If transmission is received or the probe timer expires, the device may transmit a probe request.
   b. Transmit a probe request frame (or multiple of thereof) with the SSID and the BSSID fields set as per the scan command;
   c. Reset ProbeTimer to zero and start it upon the probe request transmission;
   d. If nothing is detected (any signal with high enough energy) on the channel before the ProbeTimer reaches MinChannelTime (a.k.a. Min_Probe_Response_Time), then go to scan the next channel (if any), else when the ProbeTimer reaches MaxChannelTime (i.e., Max_Probe_Response_Time), process all received probe responses and go to scan the next channel (if any).

2) APs:
   a. An AP shall respond with a probe response only if:
      i. The Address 1 field in the probe request frame is the broadcast address or the specific MAC address of the AP; and
      ii. The SSID in the probe request is the wildcard SSID, the SSID in the probe request is the specific SSID of the AP, or the specific SSID of the AP is included in the SSID list element of the probe request, or the Address 3 field in the probe request is the wildcard BSSID or the BSSID of the AP.
   b. Some further conditions may be set as well for the generation of a probe response.

In general, the probe request transmitter specifies the conditions that wireless devices need to meet in order to respond to with a probe response. All wireless devices that fulfill the condition try to send a probe response frame. The active scanning mechanism defines the signaling.

ii. Ad Hoc IBSS Networks

The effect of receiving a probe request is to cause the wireless device to respond with a probe response if the conditions indicated in the probe request are met. When a wireless device arrives within the communication range of any member of an ad hoc network, its probe request frame inquiry signals are answered by a member of the ad hoc network detecting the inquiry. A device in an ad hoc network that broadcasted the latest beacon in the network responds to the probe request frame inquiry signals with a probe response containing the address of the responding device. The probe response frame also includes the timestamp, beacon interval, capability information, information elements of the SSID, supported rates, one or more physical parameter sets, the optional contention-free parameter set, and the optional ad hoc network parameter set.

Once a device has performed an inquiry that results in one or more ad hoc network descriptions, the device may choose to join one of the ad hoc networks. The joining process may be a purely local process that occurs entirely internal to the wireless device. There may be no indication to the outside world that a device has joined a particular ad hoc network. Joining an ad hoc network may require that all of the wireless device's MAC and physical parameters be synchronized with the desired ad hoc network. To do this, the device may update its timer with the value of the timer from the ad hoc network description, modified by adding the time elapsed since the description was acquired. This will synchronize the timer to the ad hoc network. The BSSID of the ad hoc network may be adopted, as well as the parameters in the capability information field. Once this process is complete, the wireless device has joined the ad hoc network and is ready to begin communicating with the devices in the ad hoc network.

c. Probe Response

The probe response sent back by a wireless device that met the conditions set by the received probe request may contains a timestamp, beacon interval, and capability information. It may also include the SSID of the BSS, supported rates, and PHY parameters.

According to an example embodiment, standard spacing intervals are defined in the IEEE 802.11 specification, which delay a station's access to the medium, between the end of the last symbol of the previous frame and the beginning of the first symbol of the next frame. The short interframe space (SIFS), may allow acknowledgement (ACK) frames and clear to send (CTS) frames to have access to the medium before others. The longer duration distributed coordination function (DCF) interframe space (IFS) or DCF Interframe Space (DIFS) interval may be used for transmitting data frames and management frames.

According to an example embodiment, after the channel has been released, IEEE 802.11 and before a probe response is transmitted, wireless devices may normally employ a spectrum sensing capability during the SIFS interval or DIFS interval, to detect whether the channel is busy. A carrier sensing scheme may be used wherein a node wishing to transmit a probe response has to first listen to the channel for a predetermined amount of time to determine whether or not another node is transmitting on the channel within the wireless range. If the channel is sensed to be idle, then the node may be permitted to begin the transmission process. If the channel is sensed to be busy, then the node may delay its transmission of a probe response for a random period of time called the backoff interval. In the DCF protocol used in IEEE 802.11 networks, the stations, on sensing a channel idle for DIFS interval, may enter the backoff phase with a random value between 0 and a maximum value CWmin. The backoff counter may be decremented from this selected value as long as the channel is sensed idle for a predetermined time interval. After every received frame one may however wait for a DIFS before sensing the channel status and resuming backoff counter update.

3. Generic Advertisement Service (GAS)

IEEE 802.11u-2011 is an amendment to the IEEE 802.11-2007 base standard published as *IEEE 802.11u-2011, Wireless LAN Medium Access Control (MAC) and Physical Layer (PHY) Specifications, Amendment 9: Interworking with External Networks*, Feb. 25, 2011 (incorporated herein by reference). IEEE 802.11u-2011 adds features to improve interworking with external networks. IEEE 802.11u-2011 amendment establishes MAC and physical layer PHY protocols for an interworking service to permit a wireless device to exchange information with an external network, to enable the selection of networks to connect to, and to enable access to emergency services. A GAS is specified in the IEEE 802.11 amendment to enable mobile wireless devices or STAs to discover the availability of information related to desired network services. For example, the GAS enables discovery of information about services provided in an infrastructure basic service set, information about local access services, information from available Subscription Service Providers (SSP) and/or Subscription Service Provider Networks (SSPNs) or other external networks. GAS enables a wireless device to transmit a generic advertisement service initial request frame to request information about network services from access points and it enables an access point to use a generic container, a GAS initial response frame, to advertise information about network services over an IEEE 802.11 network. The GAS protocol has been proposed to be updated to operate with broadcast request and response messages. Public action frames are used to transport the GAS initial request frame and the GAS initial response frame.

4. Wi-Fi Direct

The Wi-Fi Alliance has developed a Wi-Fi Peer-to-Peer technology named Wi-Fi Direct™ that is specified in the *Wi-Fi Alliance Peer-to-Peer Specification*, October 2010 (incorporated herein by reference). Wi-Fi Direct is also referred to herein as Peer-to-Peer (P2P) or Device-to-Device (D2D). Wi-Fi Direct enables IEEE 802.11a, g, or n devices to connect to one another, peer-to-peer, without prior setup or the need for wireless access points. Devices that support Wi-Fi Direct may discover one another and advertise available services. Wi-Fi Direct devices support typical Wi-Fi ranges and the same data rates as can be achieved with an 802.11a, g, or n infrastructure connection. When a device enters the range of the Wi-Fi Direct device, it may connect to it using the specified protocol.

Wi-Fi Direct enables wireless devices that support Wi-Fi Direct, to connect to one another, point-to-point, without joining an infrastructure network. Wireless devices that support the specification will be able to discover one another and advertise available services. Wi-Fi Direct devices will support typical Wi-Fi ranges and the same data rates as can be achieved with an infrastructure connection. Wi-Fi Direct provides point-to-point connections for networks by embedding a software access point into any Wi-Fi Direct devices.

Wi-Fi Direct-certified devices may create direct connections between each other without requiring the presence of a traditional Wi-Fi infrastructure network of an access point or router. Wi-Fi Direct Device Discovery and Service Discovery features allow users to identify available devices and services before establishing a connection, for example, discovering which Wi-Fi Direct devices have a printer. Wi-Fi Direct devices may use Wi-Fi Protected Setup to create connections between devices.

A Wi-Fi Direct device is capable of a peer-to-peer connection and may support either an infrastructure network of an access point or router or a peer-to-peer connection. Wi-Fi Direct devices may join infrastructure networks as stations (STAs). Wi-Fi Direct devices may connect by forming groups in a one-to-one or one-to-many topology. The groups functions in a manner similar to an infrastructure basic service set. A single Wi-Fi Direct device will be the group owner that manages the group, including controlling which devices are allowed to join and when the group is started or terminated.

The group owner is responsible for responding to probe requests in a similar manner as an AP of an infrastructure BSS. The group owner will appear as an access point to legacy client devices. A significant difference between a group owner and an access point is that it is optional for the group owner to route and forward traffic between clients associated to it.

Wi-Fi Direct devices include Wi-Fi Protected Setup Internal Registrar functionality. A Wi-Fi Direct device may be a group owner of a group and may be able to negotiate which device adopts this role when forming a group with another Wi-Fi Direct device. A group may include both Wi-Fi Direct devices and legacy devices (i.e., that are not compliant with the Wi-Fi Alliance Peer-to-Peer Specification). Legacy devices may only function as clients within a group.

Wi-Fi Direct devices may support discovery mechanisms. Device discovery is used to identify other Wi-Fi Direct devices and establish a connection by using a scan similar to that used to discover infrastructure access points. If the target is not already part of a group, a new group may be formed. If the target is already part of a group, the searching Wi-Fi Direct device may attempt to join the existing group. Wi-Fi Protected Setup may be used to obtain credentials from the group owner and authenticate the searching Wi-Fi Direct device. Wi-Fi Direct devices may include service discovery that enables the advertisement of services supported by higher layer applications to other Wi-Fi Direct devices. Service discovery may be performed at any time (e.g. even before a connection is formed) with any other discovered Wi-Fi Direct device.

A Group may be created by a single Wi-Fi Direct device. When forming a connection between two Wi-Fi Direct devices, a group may be formed automatically and the devices may negotiate to determine which device is the group owner. The group owner may decide if this is a temporary (single instance) or persistent (multiple, recurring use) group. After a group is formed, a Wi-Fi Direct device may invite another Wi-Fi Direct device to join the group. The decision of whether or not to accept an invitation may be left to the invited Wi-Fi Direct device.

B. Probe Request and Response Exchange

Many use cases for wireless local area networks (WLANs) may be improved by a faster initial link setup. For example, offloading traffic from a wide area network to a WLAN in an efficient way requires a fast initial link setup for the local area network.

Example WLANs that may be available for offloading traffic from a wide area network include, for example, IEEE 802.11, Digital Enhanced Cordless Telecommunications (DECT), and HiperLAN networks.

WLAN discovery mechanisms include passive and active scanning. In the passive scanning mode, a device or station listens to a channel for no longer than an interval determined for the scan. In practice, the passively scanning device looks for beacon frames from any access points (APs) or alternatively beacon frames that meet a given criterion, such as a device address or network ID. When a device uses the active scanning, it generates probe request frames and transmits them to request APs to reply with probe response frames providing requested information.

It may be beneficial for scanning devices to reduce the level of traffic contributed by their scanning operations. In an example embodiment of the invention, a scanning device may transmit a wireless message, such as a probe request, including at least one condition for response from one or more wireless devices, such as access point devices. The condition for response may include at least one of receive power of the wireless message at the one or more wireless devices, service level of the one or more wireless devices, or identity of the one or more wireless devices that can respond with a selected response. By imposing a condition for response, the scanning device is able to limit the number of received responses from the one or more wireless devices, to only those that are able to satisfy the at least one condition. In an example embodiment of the invention, the scanning device may have learned of the proximity of a network or access point, using a geolocation-based database.

In example embodiments, the request may be a generalized management, control, or data frame including an information element that contains the at least one condition for response from one or more wireless devices, in accordance with an example embodiment of the invention. In example embodiments, the request may be an IEEE 802.11 probe request or a generic advertisement service initial request. In example embodiments, one or more wireless devices mobile wireless devices or they may be generalized as a hub device representing either an access point device in an infrastructure network or a group owner device in a peer-to-peer network, in accordance with example embodiments of the invention.

In an example embodiment of the invention, the wireless message may include a receive power threshold value and the condition for response is that receive power of the wireless message at the one or more wireless devices is above the receive power threshold value.

In an example embodiment of the invention, the wireless message may include one or more service level related threshold values including BSS Load threshold, BSS Average Access Delay threshold, BSS Available Admission Capacity threshold, BSS AC Delay threshold, or Extended BSS Load Element threshold and the condition for response is that the BSS Load, BSS Average Access Delay, BSS Available Admission Capacity, BSS AC Delay, or Extended BSS Load Element of the one or more wireless devices is below the respective threshold value In an example embodiment of the invention, the wireless message may include a specification of one or more types of selected responses from the one or more identified wireless devices, including a control frame, a short probe response, a measurement pilot or a beacon frame.

In accordance with example embodiments of the invention, unnecessary responses are eliminated, resulting in higher speed scanning, improved device discovery time, reduced network load, and a reduction in power consumption of the scanning device.

FIG. 1A illustrates an example wireless network diagram of a sending wireless node, NODE A, broadcasting a first message 100 to a plurality of seven receiving wireless nodes NODE 1 to NODE 7, in accordance with example embodiments of the invention. In example embodiments, the first message 100 may be a generalized management, control, or data frame, for example an IEEE 802.11 probe request or a generic advertisement service (GAS) initial request. In example embodiments, the sending wireless node, NODE A, may be generalized as a mobile or fixed station device or a hub device representing either an access point device in an infrastructure network or a group owner (GO) device in a peer-to-peer (P2P) network, in accordance with example embodiments of the invention. In example embodiments, one or more of the seven receiving wireless node devices NODE 1 to NODE 7, may be generalized as a mobile or fixed station device or a hub device representing either an access point device in an infrastructure network or a group owner (GO) device in a P2P network, in accordance with example embodiments of the invention. Any of the devices NODE 1 to NODE 7A may be a modern smartphone configured as an access point so that it may share its cellular telephone connection with other surrounding devices via a WLAN link.

In an example embodiment of the invention, the first message 100 may include at least one condition for response 110 from one or more wireless devices NODE 1 to NODE 7, the condition for response 110 including at least one of receive power of the wireless message at the one or more wireless devices 112, service level of the one or more wireless devices 114, or identity of the one or more wireless devices that can respond with a selected response 116.

In an example embodiment of the invention, the first message 100 may include a receive power threshold value 112' and the condition for response is that receive power of the wireless message at the one or more wireless devices NODE 1 to NODE 7 is above the receive power threshold value.

In an example embodiment of the invention, the first message 100 may include one or more service level related threshold values 114' including BSS Load threshold, BSS Average Access Delay threshold, BSS Available Admission Capacity threshold, BSS AC Delay threshold, or Extended BSS Load Element threshold and the condition for response is that the BSS Load, BSS Average Access Delay, BSS Available Admission Capacity, BSS AC Delay, or Extended BSS Load Element of the one or more wireless devices NODE 1 to NODE 7 is below the respective threshold value.

In an example embodiment of the invention, the first message 100 may include a specification 116' of one or more types of selected responses from the one or more identified wireless devices, for example, NODE 1, NODE 3, and NODE 4, including a control frame, a short probe response, a measurement pilot or a beacon frame.

By imposing a condition for response 110, the scanning device NODE A is able to limit the number of received responses from the one or more wireless devices NODE 1 to NODE 7, to only those that are able to satisfy the at least one condition.

FIG. 1B illustrates the example wireless network diagram of FIG. 1A, of three receiving wireless nodes NODE 1, NODE 3, and NODE 4 of the plurality of seven receiving wireless node devices, replying to the wireless message 100 with a response 120(1), 120(3), 120(4) with their respective discovery data, for example node name, MAC address and/or SSID, in accordance with an example embodiment of the invention. The three receiving wireless nodes NODE 1, NODE 3, and NODE 4 have received the wireless message 100 from the sending device NODE A. The wireless message 100 included at least one condition for response 110 from the sending device NODE A. The condition for response 110 included at least one of receive power of the wireless message at the apparatus 112, service level of the apparatus 114, or identity of the apparatus and that the apparatus can respond with a selected response 116. The three receiving wireless nodes NODE 1, NODE 3, and NODE 4 determine that they can satisfy the at least one condition 110 and therefore they respectively transmit a response 120(1), 120(3), 120(4). The response 120(1), 120(3), 120(4) may be any message that is suitable to be received by Node A. For example, the response 120(1), 120(3), 120(4) may be one of a control frame, a short probe response, a measurement pilot, a beacon frame, or a regular probe response. In an embodiment, the responding nodes Node 1, Node 3, and Node 4 may determine the type of the response 120(1), 120(3), 120(4) based on the status of the particular node, for example the messages that are to be sent in the future, or within a certain time period. If the responding nodes Node 1, Node 3, and Node 4 determine that there are not suitable messages to be transmitted, the nodes may transmit regular probe response to the requesting Node A. Determining whether a message is suitable to be sent instead of a regular probe response may include considering the capabilities of the requesting node, for example a maximum transmission rate.

In an example embodiment of the invention, the first message 100 may include a receive power threshold value 112' and the condition for response 112 is that receive power of the wireless message at the one or more wireless devices NODE 1 to NODE 7 is above the receive power threshold value. The three receiving wireless nodes NODE 1, NODE 3, and NODE 4 determine that they can satisfy this condition 112 and therefore they respectively transmit a response 120(1), 120(3), 120(4).

In an example embodiment of the invention, the first message 100 may include one or more service level related threshold values 114' including BSS Load threshold, BSS Average Access Delay threshold, BSS Available Admission Capacity threshold, BSS AC Delay threshold, or Extended BSS Load Element threshold and the condition for response is that the BSS Load, BSS Average Access Delay, BSS Available Admission Capacity, BSS AC Delay, or Extended BSS Load Element of the one or more wireless devices NODE 1 to NODE 7 is below the respective threshold value. The three receiving wireless nodes NODE 1, NODE 3, and NODE 4 determine that they can satisfy this condition 114 and therefore they respectively transmit a response 120(1), 120(3), 120(4).

In an example embodiment of the invention, the first message 100 may include a specification 116' of one or more types of selected responses from the one or more identified wireless devices, for example, NODE 1, NODE 3, and NODE 4, including a control frame, a short probe response, a measurement pilot or a beacon frame. The three receiving wireless nodes NODE 1, NODE 3, and NODE 4 determine that they can satisfy this condition 116 and therefore they respectively transmit a response 120(1), 120(3), 120(4). The response 120(1), 120(3), 120(4) may be a control frame, a short probe response, a measurement pilot or a beacon frame.

Node A may receive one or more types of selected responses from the one or more identified wireless devices NODE 1, NODE 3, and NODE 4, including a control frame, a short probe response, a measurement pilot or a beacon frame. Node A may then measure the quality of the link to the one or more identified wireless devices using the received response.

FIG. 2 illustrates an example of the wireless message 100 broadcast by the sending wireless node, NODE A, as a generalized frame body that includes an information element 102, in accordance with an example embodiment of the invention. In example embodiments, the message 100 may be a generalized management, control, or data frame including an information element 102 that contains the conditions for response 110. In an example embodiment for a probe request 100, the conditions for response 110 may include the receive power of the probe request at the receiving devices 112, the service level of the receiving devices 114, and/or the identity of the receiving devices that can respond with a selected response 116.

The message 100 includes a header with MAC frame control information field 211 and address fields 212 and the information element 102. The information element 102 includes the element ID field 213, the length field 214, and the information field that contains the conditions for response 110. By imposing a condition for response 110, the scanning device NODE A is able to limit the number of received responses from the one or more wireless devices NODE 1 to NODE 7, to only those that are able to satisfy the at least one condition. Typically all conditions of the Probe Request are met by the responding nodes. In example embodiments, the wireless message 100 may be a generalized management, control, or data frame including an information element that contains the conditions for response 110 information, in accordance with an example embodiment of the invention.

In an example embodiment of the invention, the information element 102 may be freely used in management frames, depending on the information element definition. For example, if the information element is defined as a conditions for response information element, the information element may be primarily useful in request frames transmitted with a broadcast or groupcast address to other devices that may respond. However, the information element 102 may also be used for informational purposes in control frames, beacons, and data frames, depending on the information element definition.

FIG. 2A illustrates an example of the wireless message 100, such as a probe request frame, which includes the receive power of the probe request at the receiving devices 112 as the conditions for response 110, in accordance with an example embodiment of the invention. Probe request frame 100 includes an IEEE 802.11 management header that includes MAC frame type 221 indicating it is a management frame. Field 222 identifies the frame 100 as a probe request packet. Field 225 is the source address for NODE A and field 224 is the broadcast address. The payload portion of the probe request frame 100 includes the information element 102 that includes the conditions for response 110 information.

In an example embodiment of the invention, the conditions for response 110 may include a new Receiver Signal Strength Limit (RSSL) element to Probe Request frame 100. The RSSL field contains an unsigned integer in units of 0.5 dB. Value 0 indicates that devices NODE 1 to NODE 7 that have received the message with −82 dBm (the clear channel assessment (CCA) busy threshold) are obliged to respond, value 1 means that devices that have received the message with −81.5 dBm are obliged to respond, value 100 means that devices that have received the request with −32 dBm and so on.

The objective of the operation by the scanning device NODE A is to locate an AP NODE 1 to NODE 7 that offers good link quality.

One or more of the devices NODE 1 to NODE 7 receives the probe request frame 100, which includes the threshold value of the receive power of the probe request at the receiving devices 112. If the receiving device determines that it can satisfy the condition that the receive power of the wireless message at the apparatus is above the receive power threshold value, then it transmits a response 120.

By imposing a condition for response 110 that includes the receive power of the probe request at the receiving devices 112, the scanning device NODE A is able to limit the number of received responses from the one or more wireless devices NODE 1 to NODE 7, to only those that are able to satisfy the at least one condition.

FIG. 2B illustrates an example of the wireless message 100, such as a probe request frame, which includes the service level of the receiving devices 114 as the conditions for response 110, in accordance with an example embodiment of the invention. Probe request frame 100 includes an IEEE 802.11 management header that includes MAC frame type 221 indicating it is a management frame. Field 222 identifies the frame 100 as a probe request packet. Field 225 is the source address for NODE A and field 224 is the broadcast address. The payload portion of the probe request frame 100 includes the information element 102 that includes the conditions for response 110 information.

In an example embodiment of the invention, the conditions for response 110 is the service level 114 of the receiving devices NODE 1 to NODE 7. The conditions for response 110 may include the thresholds 114', including BSS Load threshold, BSS Average Access Delay threshold, BSS Available Admission Capacity threshold, BSS access category (AC) Delay threshold, or Extended BSS Load Element threshold. The condition for response is that the BSS Load, BSS Average Access Delay, BSS Available Admission Capacity, BSS AC Delay, and/or Extended BSS Load Element of the one or more receiving wireless devices NODE 1 to NODE 7 is below the respective threshold value. The conditions for response 110 may include one or more of these service level related parameters.

One or more of the devices NODE 1 to NODE 7 receives the probe request frame 100, which includes the required service level 114 that must be possessed by a receiving device. If the receiving device determines that it can satisfy the condition that it has the required service level 114, then it transmits a response 120.

By imposing a condition for response 110 that includes the service level of the receiving devices 114, the scanning device NODE A is able to limit the number of received responses from the one or more wireless devices NODE 1 to NODE 7, to only those that are able to satisfy the at least one condition.

The element ID is set to indicate the Performance Level Threshold element. The length field indicates the length of the information element in units of octets.

The STA Count Threshold field is interpreted as an unsigned integer of associated STAs. The AP responds to the probe request, if the amount of associated STAs in BSS is equal or smaller than the value of STA Count Threshold. The maximum value 65535 of the STA Count Threshold field is reserved.

The Channel Utilization field is defined as the percentage of time, linearly scaled with 255 representing 100%, that the AP sensed the medium was busy, as indicated by either the physical or virtual carrier sense (CS) mechanism. When more than one channel is in use for the BSS, the Channel Utilization field value is calculated only for the primary channel.

The Available Admission Capacity Threshold field contains a threshold value for the Available Admission Capacity field. The AP responds to the probe request, if the value of the Available Admission Capacity field is equal or larger than the Available Admission Capacity Threshold field value. The maximum value 255 of the Available Admission Capacity Threshold field is reserved.

The BSS Average Access Delay Threshold field sets the threshold for average access delay of the responding devices. The AP responds to the probe request, if its BSS Average Access Delay field value is equal or smaller than the Average Access Delay Threshold. The maximum value 255 of the BSS Average Access Delay Threshold field is reserved.

BSS AC Delay Threshold field is formatted as four BSS Average Access Delay Threshold fields. The in the first octet contains BSS AC Delay Threshold for AC0, the second octet contains BSS AC Delay Threshold for AC1, third for AC2 and the last for AC3. The AP responds to the probe request, if its value of the Access Category Specific Delay [AC] field is equal or smaller than the AC Specific Delay Threshold [AC] for the same AC. The maximum value 255 of the BSS AC specific Access Delay Threshold field is reserved.

The multi-user (MU)-multiple-input and multiple-output (MIMO) Capable STA Count Threshold field sets the threshold for the amount of MU-MIMO capable STAs. The AP responds to the probe request, if it has the equal or less associated STAs with 1 in the MU Rx Capable field of their very high throughput (VHT) Capabilities element. The maximum value 255 of the MU-MIMO Capable STA Count Threshold is reserved.

The Spatial Stream Underutilization Threshold field sets the threshold for the Spatial Stream Underutilization. The AP responds to the probe request, if its Spatial Stream Underutilization field value is equal or larger than the Spatial Stream Underutilization Threshold field value in the probe request frame. Value 0 of the Spatial Stream Underutilization Threshold is reserved.

The VHT 40 MHz Utilization Threshold field sets the threshold for the 40 MHz Utilization field. The AP responds to the probe request frame, if it has the 40 MHz Utilization field value equal or smaller than the 40 MHz Utilization Threshold field value in the probe request frame. The maximum value 255 of the VHT 40 MHz Utilization Threshold is reserved. The AP shall not respond to the probe request, if its operation bandwidth is less than 40 MHz.

The VHT 80 MHz Utilization Threshold field sets the threshold for the 80 MHz Utilization field. The AP responds to the probe request frame, if it has the 80 MHz Utilization field value equal or smaller than the 80 MHz Utilization Threshold field value in the probe request frame. The maximum value 255 of the VHT 80 MHz Utilization Threshold is reserved. The AP shall not respond to the probe request, if its operation bandwidth is less than 80 MHz.

The VHT 160 MHz Utilization Threshold field sets the threshold for the 160 MHz Utilization field. The AP responds to the probe request frame, if it has the 160 MHz Utilization field value equal or smaller than the 160 MHz Utilization Threshold field value in the probe request frame. The maximum value 255 of the VHT 160 MHz Utilization Threshold is reserved. The AP shall not respond to the probe request, if its operation bandwidth is less than 160 MHz.

The Available Admission Capacity Threshold for all user priority (UP) values that are defined in Available Admission Capacity Bitmask Threshold field. The Available Admission Capacity Threshold Bitmask has the same coding as Available Admission Capacity bitmask field.

The Available Admission Capacity Threshold List contains Available Admission Capacity Threshold fields in the order of the UP, lowest first. The Available Admission Capacity Threshold field sets the threshold for the Available Admission Capacity field. The AP that responds to the probe request frame, if it has equal or larger value in the UP Specific Available Admission Capacity field than the UP Specific Available Admission Capacity Threshold field value in probe request frame.

Node A receives one or more types of selected responses from the one or more identified wireless devices, including a control frame, a short probe response, a measurement pilot or a beacon frame. Node A may then measure the quality of the link to the one or more identified wireless devices using the received response.

FIG. 2C illustrates an example of the wireless message 100, such as a probe request frame, which includes the identity of the receiving devices that can respond with a selected response 116, as the conditions for response 110, in accordance with an example embodiment of the invention. Probe request frame 100 includes an IEEE 802.11 management header that includes MAC frame type 221 indicating it is a management frame. Field 222 identifies the frame 100 as a probe request packet. Field 225 is the source address for NODE A and field 224 is the broadcast address. The payload portion of the probe request frame 100 includes the information element 102 that includes the conditions for response 110 information.

In an example embodiment of the invention, the conditions for response 110 is the identity of the receiving devices that can respond with a selected response 116. The probe request frame 100 may include a specification 116' of one or more types of selected responses from the one or more identified wireless devices, for example, NODE 1, NODE 3, and NODE 4, including a control frame, a short probe response, a measurement pilot or a beacon frame.

The condition for response 110 defines addresses (MAC, BSSID, SSID, or Mesh Id) of receiving devices NODE 1, NODE 3, and NODE 4 that may send other types of frames instead of a probe response, as a response 120 to the probe request 100. If an AP NODE 1, NODE 3, and NODE 4 receives a probe request 100 with such condition, it may check whether it is going to transmit a suitable message in response. If there is such message to be transmitted as a response, then the probe response is not needed. A suitable message may be any message (to any other user), which the sender NODE A of the probe request 100 is able to receive (for example, that it has a suitable transmit rate). A response frame 120 may be requested from the candidate AP devices NODE 1 to NODE 7 to measure the radio link performance between NODE A and the responding device.

In an example embodiment of the invention, the responses 120 from the one or more receiving devices NODE 1 to NODE 7, may be forwarded or sent to another wireless device, instead of the source NODE A.

One or more of the devices NODE 1 to NODE 7 receives the probe request frame 100, which includes the identity of the receiving devices that can respond with a selected response 116. If the receiving device determines that it has the specified identity and that it can respond with the selected response, then it transmits the selected response 120.

By imposing a condition for response 110 that includes the identity of the receiving devices that can respond with a selected response 116, the scanning device NODE A is able to limit the number of received responses from the one or more wireless devices NODE 1 to NODE 7, to only those that are able to satisfy the at least one condition.

Conditions for response 110 define the MAC Addresses, BSSIDs, SSIDs or Mesh Ids that may only send a short Probe Response, Beacon or Measurement Pilot frame or a control frame as a response 120 to the probe request 100. The source device NODE A may specify the type of response frame 120 that the receiving device must reply with, which many include any of management frames, control frames and data frames. The frame 120 that is transmitted as response may be transmitted as an omnidirectional transmission and no beam steering need be made for the transmitted frame 120. The transmitted frame 120 provides a sample from which a link quality measurement may be performed by NODE A. A Short Probe Response frame is transmitted to individual address of the requesting node. The Short Probe Response may include only the MAC address, frame type and optionally any information element, depending on the response condition as defined in probe request. Also, the transmitter of the Probe Response frame may include the information elements that it considers important to transmit.

The scanning device NODE A may have a list of candidate APs NODE 1, NODE 3, and NODE 4, to which it may associate, but the NODE A may have not measured the radio link performance to the candidate AP NODE 1, NODE 3, and NODE 4. The Probe Request 100 may request the candidate AP NODE 1, NODE 3, and NODE 4, to transmit a reference transmission 120 (a response with omnidirectional antenna). The reference transmission 120 enables the requesting NODE A to measure the radio link quality to the responding candidate AP NODE 1, NODE 3, and NODE 4. The scanning device NODE A considers the link performance when it selects the AP NODE 1, NODE 3, or NODE 4 for association.

The reference transmission 120 may be a control frame, for example an ACK, Block ACK, RTS, or CTS. The Control frame 120 may be used as reference transmission 120 (response) in order to avoid generation of extra overhead.

The Short response 120 may also be requested by defining a new field, Requested Response Type, to the Request Parameters field of the Probe Request frame 100. The Requested Response Type field in Probe Request 100 requests the same response type for all responses. The Response Type field in the Probe Response 120 indicates the content of the Probe Response frame 120.

Figure 2D:
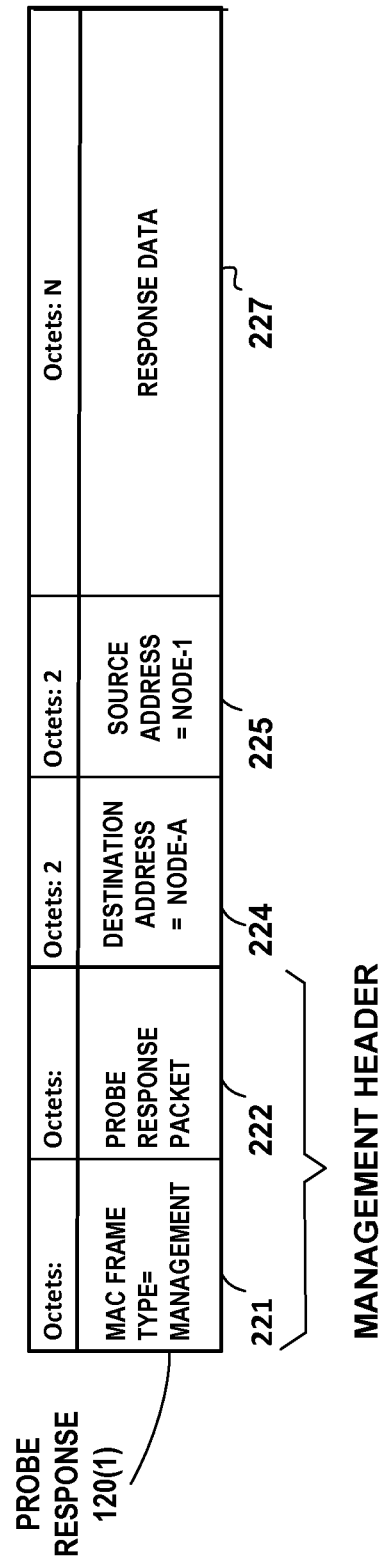
FIG. 2D illustrates an example frame body format of the probe response frame, in accordance with an example embodiment of the invention.

FIG. 2D illustrates an example frame body format of the probe response frame 120(1), in accordance with an example embodiment of the invention. FIG. 2B illustrates one example embodiment of a probe response frame 120(1) sent by the receiving wireless node, NODE 1 to the sending wireless node, NODE A. The probe response frame 120(1) includes an IEEE 802.11 management header that includes MAC frame type 221 indicating it is a management frame. Field 222 identifies the frame 120(1) as a probe response packet. Field 225 is the source address for NODE 1 and field 225 is the destination address NODE A. The payload portion 227 of the response frame 120(1) includes receiving wireless node, NODE 1 response data. In example embodiments, the receiving wireless node device NODE 1 may be generalized as a mobile or fixed station device or a hub device representing either an access point device in an infrastructure network or a group owner device in a peer-to-peer network, in accordance with example embodiments of the invention.

Figure 3A:
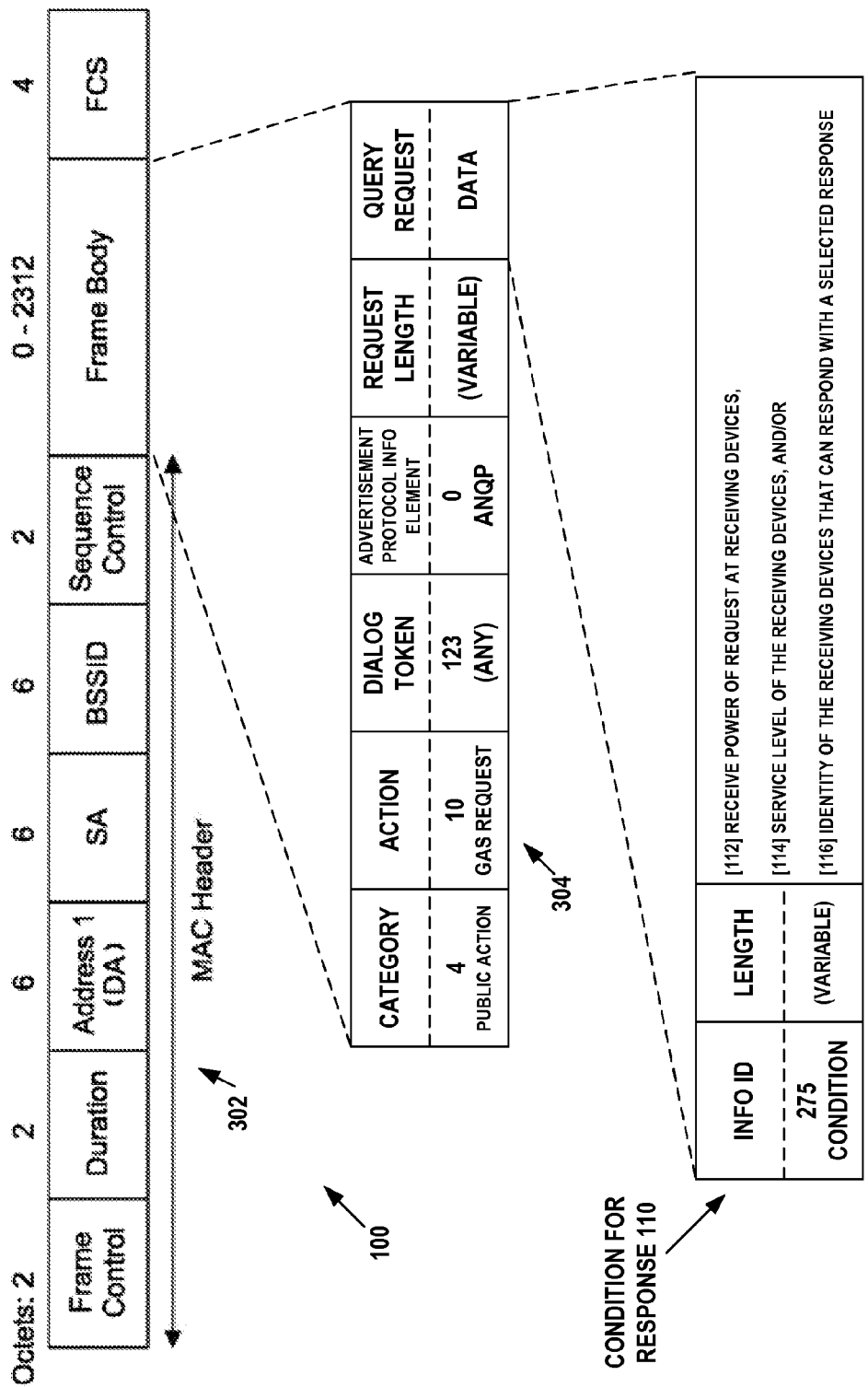
FIG. 3A illustrates an example of the wireless message as a Generic Advertisement Service Initial Request Frame, in accordance with an example embodiment of the invention.

FIG. 3A illustrates an example frame body format of the Generic Advertisement Service Initial Request Frame 100, in accordance with an example embodiment of the invention. The IEEE 802.11 MAC management frame 302 shown in FIG. 3A may have the frame control field indicate that this is a management frame, the frame type and subtype fields are set to indicate an action frame. The frame body 304 category field that may indicate a public action frame to allow communications between an access point and an unassociated STA. An action field value of 10 may indicate a GAS initial request, transmitted by a requesting STA to request information from another STA. The GAS protocol has been proposed to be updated to operate with broadcast request and response messages.

In accordance with an example embodiment of the invention, as shown in FIG. 3A, when the public action field is set to value of 10 to indicate GAS initial request 100, access network query protocol (ANQP) information elements may be sent with query request data. In accordance with an example embodiment of the invention, the query request data may include the conditions for response 110. In an example embodiment, the conditions for response 110 may include the receive power of the probe request at the receiving devices 112, the service level of the receiving devices 114, and/or the identity of the receiving devices that can respond with a selected response 116. By imposing a condition for response 110, the scanning device NODE A is able to limit the number of received responses from the one or more wireless devices NODE 1 to NODE 7, to only those that are able to satisfy the at least one condition. The dialog token field may be set by the requesting station with any value, such as "123", to identify the GAS initial request frame. The GAS initial request frame 100 may include a length value for the length of the following query request field.

Figure 3B:
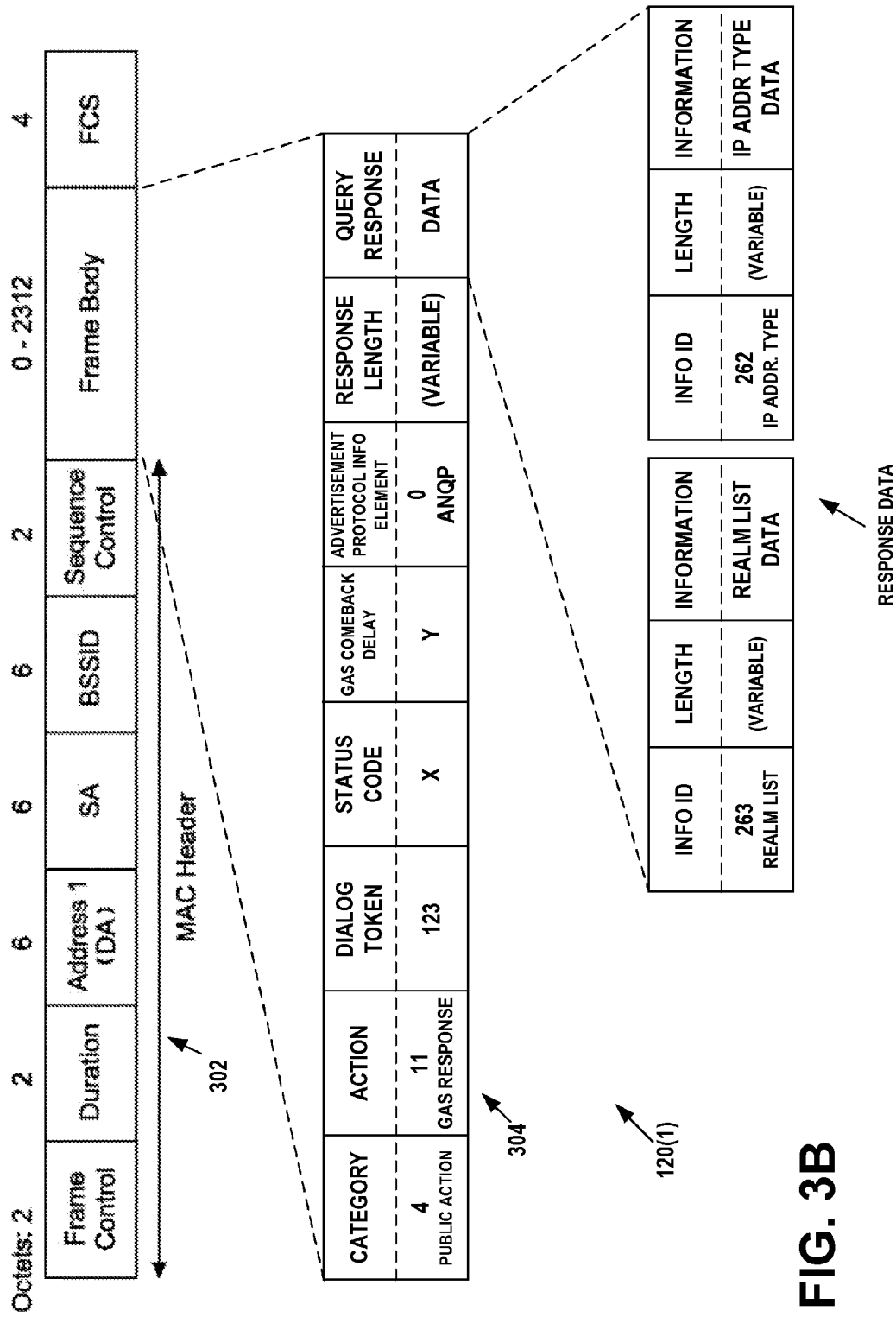
FIG. 3B illustrates an example frame body format of the Generic Advertisement Service Initial Response Frame, in accordance with an example embodiment of the invention.

FIG. 3B illustrates an example frame body format of the Generic Advertisement Service Initial Response Frame 120(1), transmitted by the receiving wireless node device NODE 1 to the sending wireless node, NODE A, in accordance with an example embodiment of the invention. The GAS initial response frame 120(1) shown in FIG. 3B, may include a category field that is set to a value of 4 indicating a public action frame. The GAS initial response frame 120(1) shown in FIG. 3B, may be sent to a unicast address, such as to sending wireless node, NODE A. There have been proposals to allow use of a broadcast address with the GAS initial response frame. The GAS initial response frame 120(1) shown in FIG. 3B, may include a dialog token field which is set to a value, such as "123", identical to the corresponding value in the GAS initial request frame 100, to enable relating the response frame to the request frame. The GAS initial response frame 120(1) shown in FIG. 3B, may include a comeback delay value field.

In accordance with an example embodiment of the invention, the Generic Advertisement Service Initial Response Frame 120(1) may have access network query protocol (ANQP) information elements sent in the query response field for the receiving wireless node device NODE 1 response data. In example embodiments, the receiving wireless node device NODE 1 may be generalized as a mobile or fixed station device or a hub device representing either an access point device in an infrastructure network or a group owner device in a peer-to-peer network, in accordance with example embodiments of the invention.

Figure 4A:
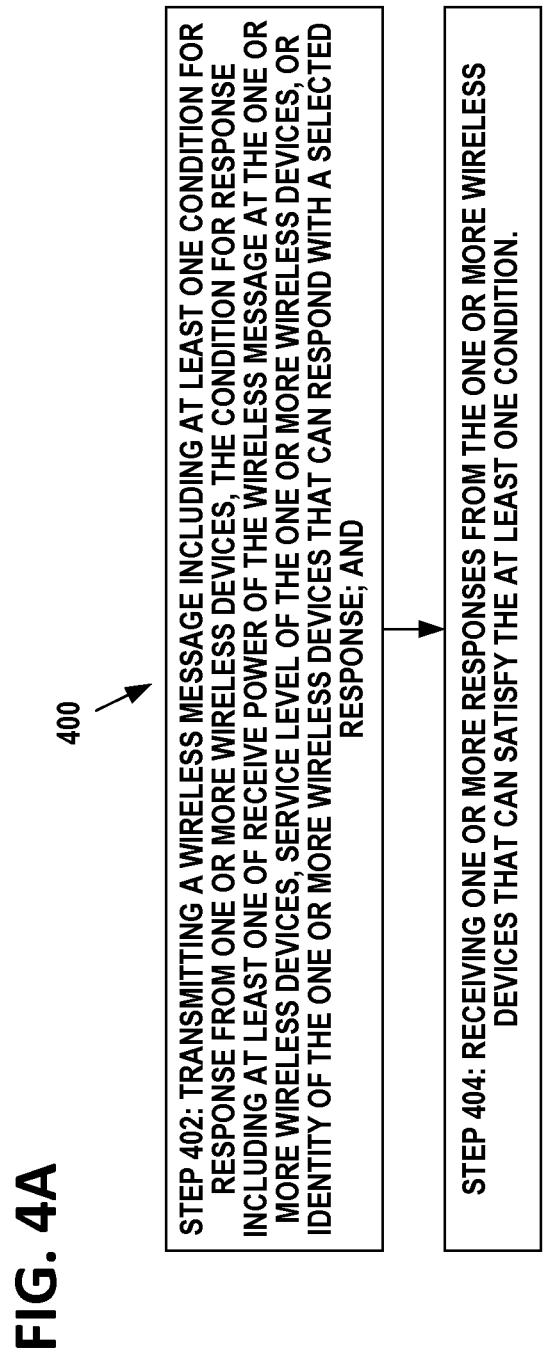
FIG. 4A illustrates an example flow diagram of operational steps of an example embodiment of the procedure performed in the sending wireless node, NODE A, according to an embodiment of the present invention.

FIG. 4A illustrates an example flow diagram of operational steps of an example embodiment of the procedure performed in the sending wireless node, NODE A, according to an embodiment of the present invention. FIG. 4A illustrates an example embodiment of a flow diagram 400 for the process in the sending wireless node, NODE A. FIG. 4A illustrates an example of steps in the procedure carried out by an apparatus, for example the wireless device in executing-in-place program code stored in the memory of the device. The steps in the procedure of the flow diagram may be embodied as program logic stored in the memory of the wireless device in the form of sequences of programmed instructions which, when executed in the microprocessor control logic of the device, carry out the functions of an exemplary disclosed embodiment. The steps may be carried out in another order than shown and individual steps may be combined or separated into component steps. Additional steps may be inserted into this sequence. The steps in the procedure are as follows:

Step 402: transmitting a wireless message including at least one condition for response from one or more wireless devices, the condition for response including at least one of receive power of the wireless message at the one or more wireless devices, service level of the one or more wireless devices, or identity of the one or more wireless devices that can respond with a selected response; and Step 404: receiving one or more responses from the one or more wireless devices that can satisfy the at least one condition.

Figure 4B:
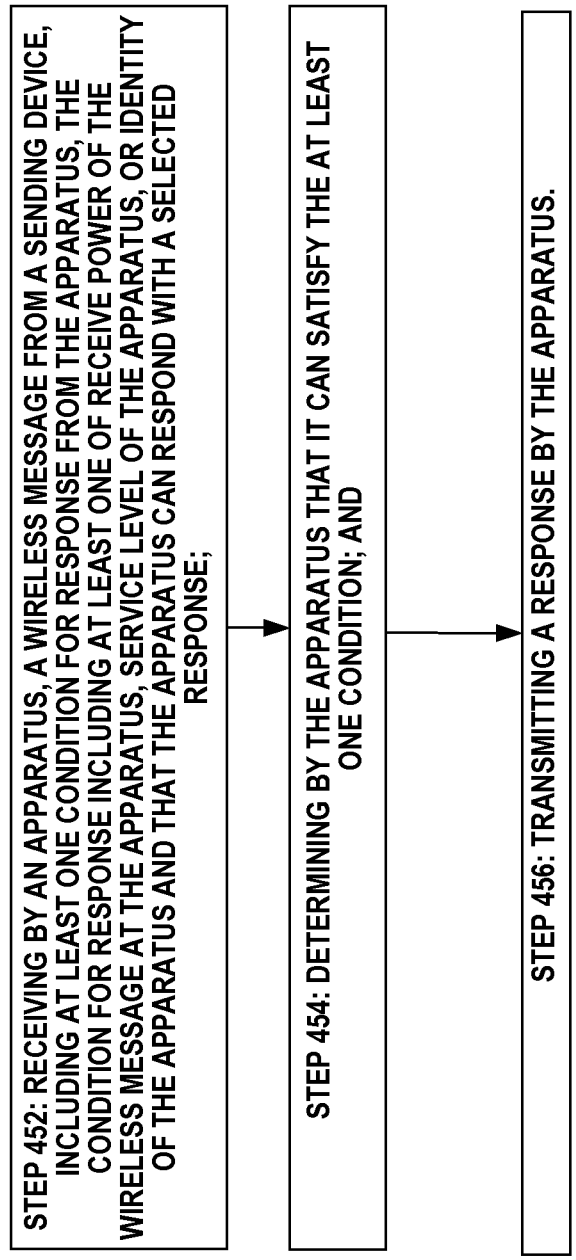
FIG. 4B is an example flow diagram of operational steps of an example embodiment of the procedure performed in the receiving wireless node device NODE 1, according to an embodiment of the present invention.

FIG. 4B is an example flow diagram of operational steps of an example embodiment of the procedure performed in the receiving wireless node device NODE 1, according to an embodiment of the present invention. FIG. 4B illustrates an example embodiment of a flow diagram 450 for the process in the receiving wireless node device NODE 1. FIG. 4B is an example of steps in the procedure carried out an apparatus, for example the wireless device in executing-in-place program code stored in the memory of the device. The steps in the procedure of the flow diagram may be embodied as program logic stored in the memory of the wireless device in the form of sequences of programmed instructions which, when executed in the microprocessor control logic of the device, carry out the functions of an exemplary disclosed embodiment. The steps may be carried out in another order than shown and individual steps may be combined or separated into component steps. Additional steps may be inserted into this sequence. The steps in the procedure are as follows:

Step 452: receiving by an apparatus, a wireless message from a sending device, including at least one condition for response from the apparatus, the condition for response including at least one of receive power of the wireless message at the apparatus, service level of the apparatus, or identity of the apparatus and that the apparatus can respond with a selected response;

Step 454: determining by the apparatus that it can satisfy the at least one condition; and Step 456: transmitting a response by the apparatus.

Figure 5A:
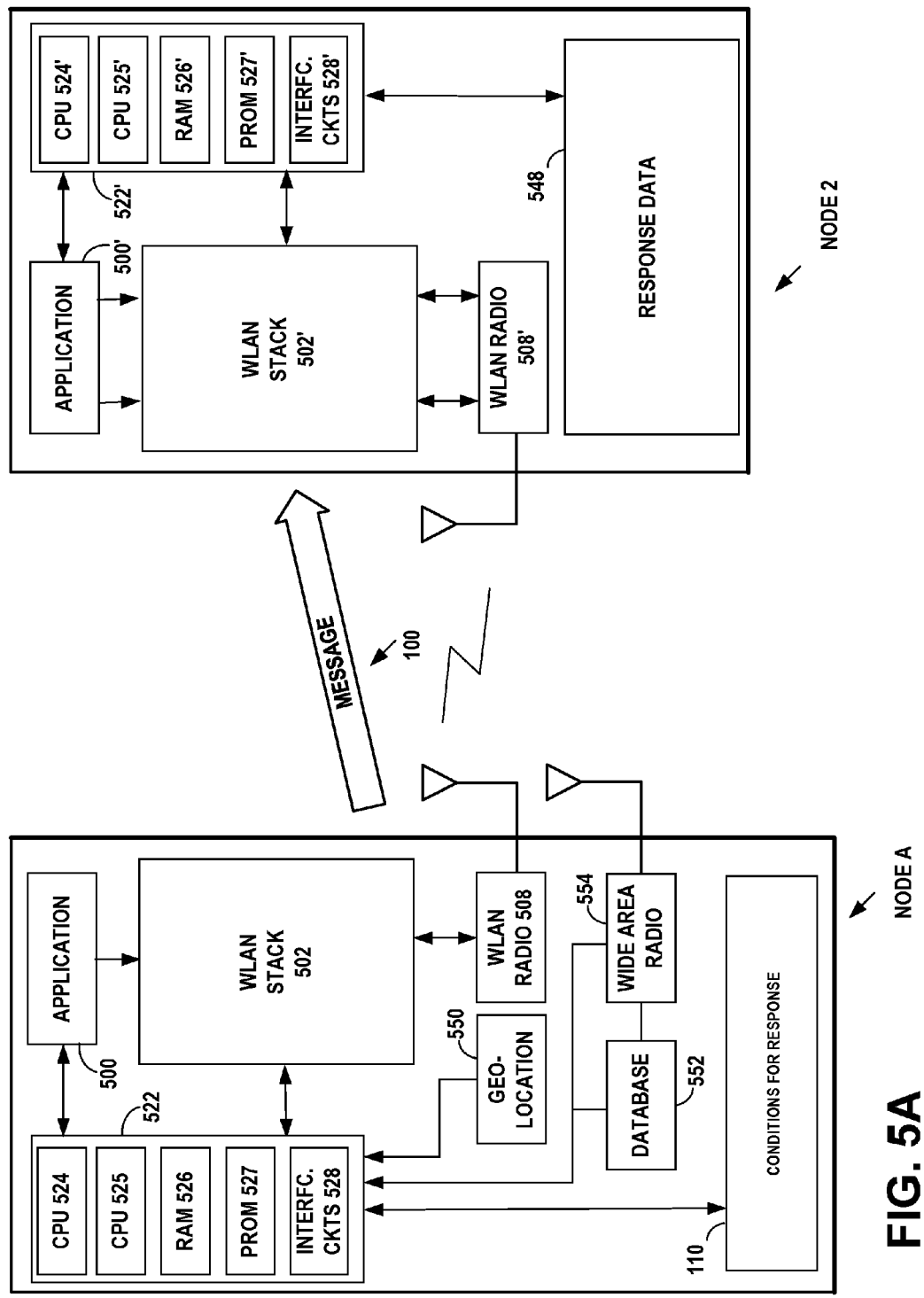
FIG. 5A illustrates an example wireless network and functional block diagram of the sending wireless node, NODE A, and the receiving wireless node, NODE 2, with the sending wireless node, NODE A, transmitting a message frame, in accordance with an example embodiment of the invention.

FIG. 5A illustrates an example wireless network and functional block diagram of the sending wireless node, NODE A, and the receiving wireless node device NODE 2, with the sending wireless node, NODE A, transmitting a message frame 100 that includes the conditions for response 110, in accordance with an example embodiment of the invention. In example embodiments, the message 100 may be a generalized management, control, or data frame including an information element that contains the conditions for response 110, in accordance with an example embodiment of the invention. In example embodiments, the message 100 may be an IEEE 802.11 probe request or a GAS initial request, in accordance with an example embodiment of the invention. Examples of wireless devices embodying NODE A and/or NODE 2 may include mobile phones, smartphones, personal digital assistants, pagers, Bluetooth™ headsets, wireless microphones, wireless remote controls, wireless sensors, laptops, palmtops, tablet computers, appliances with an embedded wireless micro-controller, engine control computers with a wireless interface, video game consoles with a wireless interface, digital toys with a wireless interface, such as a wireless robot, and the like.

Figure 5B:
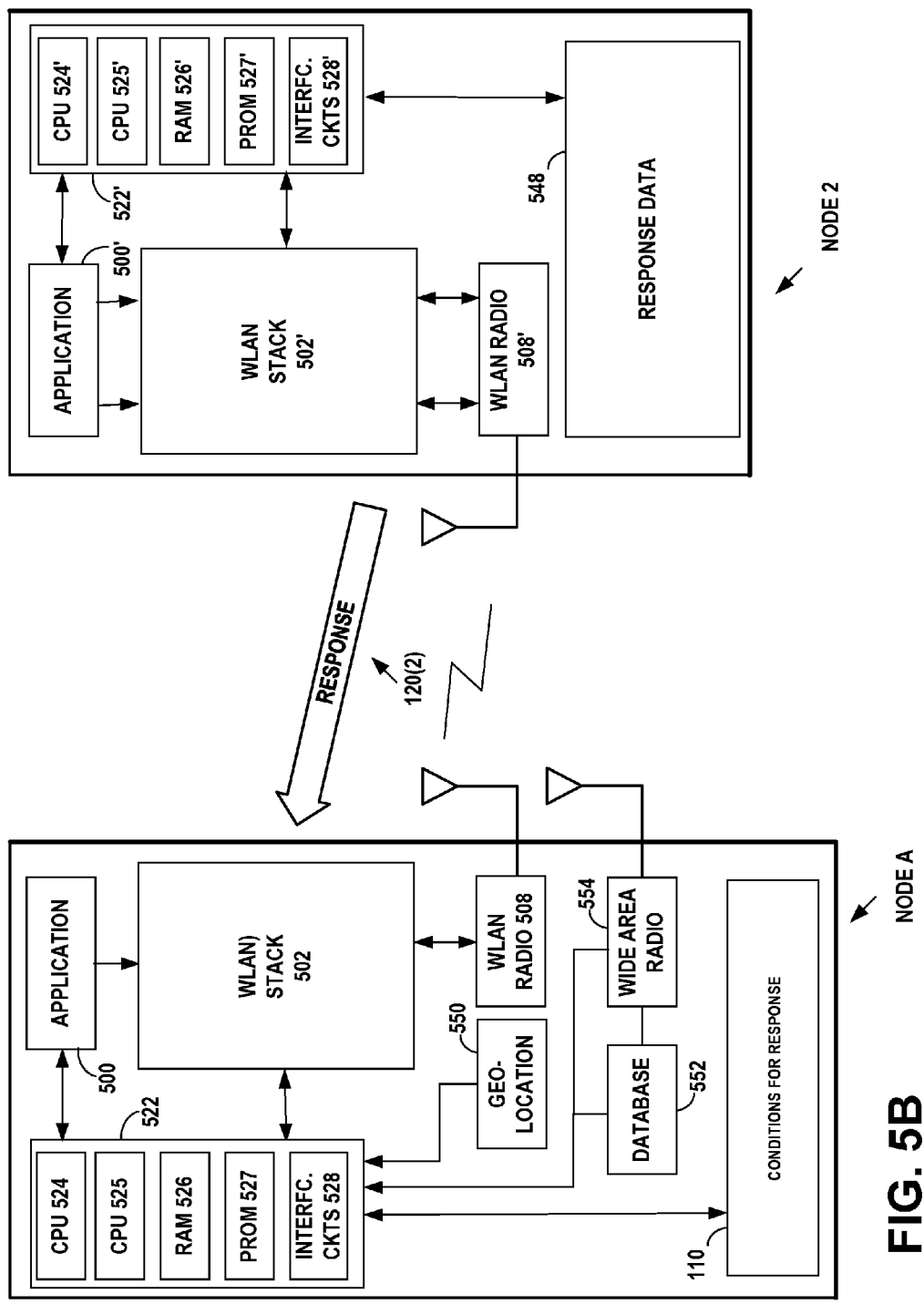
FIG. 5B illustrates the example wireless network and functional block diagram of FIG. 5A, of the sending wireless node, NODE A, and the receiving wireless node, NODE 2, with the receiving wireless node, NODE 2 transmitting a response frame, in accordance with an example embodiment of the invention.

FIG. 5B illustrates the example wireless network and functional block diagram of FIG. 5A, of the sending wireless node, NODE A, and the receiving wireless node device NODE 2, with the receiving wireless node device NODE 2 transmitting a response frame 120(2), to the sending wireless node, NODE A, in accordance with an example embodiment of the invention.

In accordance with an example embodiment of the invention, the sending wireless node, NODE A, and the receiving wireless node device NODE 2 are shown in FIGS. 5A and 5B in functional block diagram form to illustrate an example embodiment of their components. The receiving wireless node device NODE 2 may include a processor 522', which includes a single core central processing unit (CPU) or multiple core CPU 524' and 525', a random access memory (RAM) 526', a programmable read only memory (PROM) 527', and interface circuits 528' to interface with one or more radio transceivers 508', battery or house power sources, keyboard, display, etc. The RAM and PROM may be removable memory devices such as smart cards, SIMs, WIMs, semiconductor memories such as RAM, ROM, PROMS, flash memory devices, etc. Buffer 548, which may be a partition of the RAM 526' in NODE 2, buffers the response data.

In accordance with an example embodiment of the invention, the sending wireless node, NODE A, may include a processor 522, which includes a dual core central processing unit 524 and 525, a random access memory (RAM) 526, a programmable read only memory (PROM) 527, and interface circuits 528 to interface with one or more radio transceivers 508, battery and other power sources, key pad, touch screen, display, microphone, speakers, ear pieces, camera or other imaging devices, etc. in the sending wireless node, NODE A. The RAM and PROM may be removable memory devices such as smart cards, SIMs, WIMs, semiconductor memories such as RAM, ROM, PROMS, flash memory devices, etc. A buffer that may be a partition of the RAM 526 in NODE A, buffers the conditions for response 110 of addresses from which a response is not desired.

In accordance with an example embodiment of the invention, an example embodiment of the WLAN protocol stack 502 may include the IEEE 802.11 protocol in the sending wireless node, NODE A. An example embodiment of the WLAN protocol stack 502' may include the IEEE 802.11 protocol in the receiving wireless node device NODE 2. The protocol stacks 502 and 502' may be computer code instructions stored in the RAM and/or PROM memory of the respective processors 522 and 522', which when executed by the central processing units (CPU), carry out the functions of the example embodiments of the invention.

In an example embodiment of the sending wireless node, NODE A, a geolocation detector 550 establishes the current location of the sending wireless node, NODE A. The detected location may then be compared with location and address data in the local database 552 in the sending wireless node, NODE A, device, to determine if there are any other wireless devices in the area. For example, by using the database 552, if a receiving wireless node device NODE 1 is determined to be located in the area, then the address of the receiving wireless node device NODE 1 may be included in the conditions for response 110 identity of the one or more wireless devices that can respond with a selected response 116, in accordance with an example embodiment of the invention. The contents of the database 552 may be updated via the wide area radio 554 providing a wireless link to a regional database, such as the regional database 600 of FIG. 6.

Figure 6:
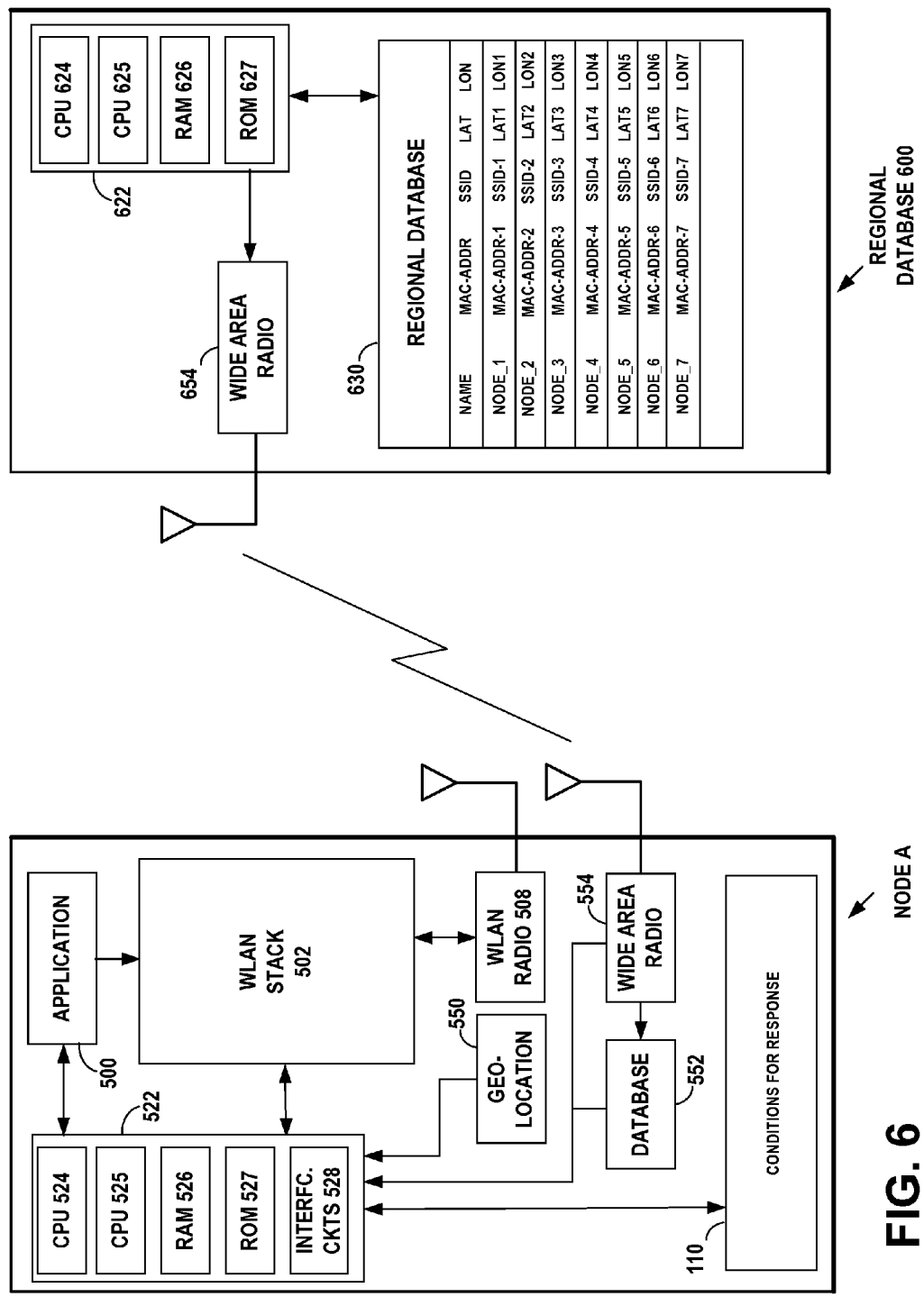
FIG. 6 illustrates the example wireless network and functional block diagram of FIG. 5A, of the sending wireless node, NODE A, and a regional database containing the geographic locations of wireless nodes and their addresses, the sending wireless node, NODE A, and the regional database communicating over a wide area wireless network, in accordance with an example embodiment of the invention.

FIG. 6 illustrates the example wireless network and functional block diagram of FIG. 5A, of the sending wireless node, NODE A, and a regional database 600 containing data representing the geographic locations of receiving wireless nodes NODE 1 to NODE 7 and their addresses, the sending wireless node, NODE A, and the regional database 600 communicating over a wide area wireless network, in accordance with an example embodiment of the invention. The regional database 600 may include a processor 622, which includes a single core central processing unit (CPU) or multiple core CPU 624 and 625, a random access memory (RAM) 626, a read only memory (ROM) 627. Buffer 630, which may be a partition of the RAM 626 in regional database 600, buffers the data representing the geographic locations of the nodes and their addresses.

The wide area wireless network may be, for example, an IEEE 802.16h wireless metropolitan area network (WMAN) (IEEE Standard 802.16h-2010) or a cellular telephone network. The contents of the local database 552 in sending wireless node, NODE A, may be updated via the wide area radio 654 in the regional database 600.

The regional database 600 may be part of a hierarchical distributed database referred to as the territory domain system. The territory domain system enables locating and identifying the geographic area of specific hosting entities, related services and information required to access the hosting entities and their services. The communication territories and interference territories are unique geographical areas that are managed by a server associated with the corresponding geographic area, in the territory domain system.

In addition to IEEE 802.11 based WLAN, the features described herein may be employed in other short-range communication technologies, such as Bluetooth, HiperLan, Wireless Universal Serial Bus (WUSB), Ultra Wide-band (UWB), ZigBee (IEEE 802.15.4, IEEE 802.15.4a), and ultra-high frequency radio frequency identification (UHF RFID) technologies.

An example embodiment of the invention further comprises an apparatus, comprising:

means for transmitting a wireless message including at least one condition for response from one or more wireless devices, the condition for response including at least one of receive power of the wireless message at the one or more wireless devices, service level of the one or more wireless devices, or identity of the one or more wireless devices that can respond with a selected response; and means for receiving one or more responses from the one or more wireless devices that can satisfy the at least one condition.

An example embodiment of the invention further comprises an apparatus, comprising:

means for receiving by an apparatus, a wireless message from a sending device, including at least one condition for response from the apparatus, the condition for response including at least one of receive power of the wireless message at the apparatus, service level of the apparatus, or identity of the apparatus and that the apparatus can respond with a selected response;

means for determining by the apparatus that it can satisfy the at least one condition; and means for transmitting a response by the apparatus.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable, non-transitory medium.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention. For instance, the features described herein may be employed in other networks beside short-range wireless networks, for example wireless local area networks.

What is claimed is:

1. A method comprising:

transmitting a wireless message including at least one condition for response from one or more wireless devices, the condition for response including receive power of the wireless message at the one or more wireless devices, service level of the one or more wireless devices, and MAC address of the one or more wireless devices that can respond with a selected response, wherein the wireless message is a probe request; and receiving one or more responses from the one or more wireless devices that can satisfy the at least one condition.

2. The method of claim 1, further comprising:
wherein the wireless message is a probe request or a generic advertisement service request.

3. The method of claim 1, further comprising:
wherein the wireless message includes a receive power threshold value and the condition for response is that receive power of the wireless message at the one or more wireless devices is above the receive power threshold value.

4. The method of claim 1, further comprising:
wherein the wireless message includes one or more service level related threshold values including BSS Load threshold, BSS Average Access Delay threshold, BSS Available Admission Capacity threshold, BSS AC Delay threshold, or Extended BSS Load Element threshold and the condition for response is that the BSS Load, BSS Average Access Delay, BSS Available Admission Capacity, BSS AC Delay, or Extended BSS Load Element of the one or more wireless devices is below the respective threshold value.

5. The method of claim 1, further comprising:
wherein the wireless message includes a specification of one or more types of selected responses from the one or more wireless devices, including a control frame, a short probe response, a measurement pilot or a beacon frame.

6. The method of claim 1, further comprising:
wherein the wireless message is a first management frame and the one or more responses are second management frames.

7. The method of claim 1, further comprising:
wherein the wireless message is at least one of a broadcast message and a groupcast message.

8. The method of claim 1, further comprising:
wherein the one or more wireless devices are known from a location database.

9. The method of claim 1, further comprising:
wherein the one or more responses from the one or more wireless devices are forwarded by the one or more wireless devices to another wireless device.

10. The method of claim 1, further comprising:
receiving one or more types of selected responses from the one or more wireless devices, including a control frame, a short probe response, a measurement pilot or a beacon frame; and assessing a quality of a link to the one or more wireless devices using the received response.

11. An apparatus comprising:
at least one processor;
at least one memory including computer program code;
the at least one memory and the computer program code configured to, with the at least one processor, cause the apparatus at least to:

transmit a wireless message including at least one condition for response from one or more wireless devices, the condition for response including receive power of the wireless message at the one or more wireless devices, service level of the one or more wireless devices, and MAC address of the one or more wireless devices that can respond with a selected response, wherein the wireless message is a probe request; and receive one or more responses from the one or more wireless devices that can satisfy the at least one condition.

12. A computer program product comprising computer executable program code recorded on a computer readable, non-transitory storage medium, the computer executable program code, when executed by a computer processor, comprising:

code for transmitting a wireless message including at least one condition for response from one or more wireless devices, the condition for response including receive power of the wireless message at the one or more wireless devices, service level of the one or more wireless devices, and MAC address of the one or more wireless devices that can respond with a selected response, wherein the wireless message is a probe request; and code for receiving one or more responses from the one or more wireless devices that can satisfy the at least one condition.

13. A method comprising:

receiving by an apparatus, a wireless message from a sending device, including at least one condition for response from the apparatus, the condition for response including receive power of the wireless message at the apparatus, service level of the apparatus, and MAC address of the apparatus and that the apparatus can respond with a selected response, wherein the wireless message is a probe request;

determining by the apparatus that it can satisfy the at least one condition; and transmitting a response by the apparatus.

14. The method of claim 13, further comprising:

wherein the wireless message is a probe request or a generic advertisement service request.

15. The method of claim 13, further comprising:

wherein the wireless message includes a receive power threshold value and the condition for response is that receive power of the wireless message at the apparatus is above the receive power threshold value; and determining by the apparatus that it can satisfy the at least one condition that the receive power of the wireless message at the apparatus is above the receive power threshold value.

16. The method of claim 13, further comprising:

wherein the wireless message includes one or more service level related threshold values including BSS Load threshold, BSS Average Access Delay threshold, BSS Available Admission Capacity threshold, BSS AC Delay threshold, or Extended BSS Load Element threshold and the condition for response is that the BSS Load, BSS Average Access Delay, BSS Available Admission Capacity, BSS AC Delay, or Extended BSS Load Element of the apparatus is below the respective threshold value; and determining by the apparatus that it can satisfy the at least one condition that the apparatus is below the respective threshold value.

17. The method of claim 13, further comprising:

wherein the wireless message includes a specification of one or more types of selected responses from the apparatus, including a control frame, a short probe response, a measurement pilot or a beacon frame; and determining by the apparatus that it can satisfy the at least one condition that the apparatus has the specified MAC address and that the apparatus can respond with the selected response.

18. The method of claim 13, further comprising:

forwarding the response to another wireless device.

19. An apparatus comprising:

at least one processor;

at least one memory including computer program code;

the at least one memory and the computer program code configured to, with the at least one processor, cause the apparatus at least to:

receiving by the apparatus, a wireless message from a sending device, including at least one condition for response from the apparatus, the condition for response including receive power of the wireless message at the apparatus, service level of the apparatus, and MAC address of the apparatus and that the apparatus can respond with a selected response, wherein the wireless message is a probe request;

determining by the apparatus that it can satisfy the at least one condition; and transmitting a response by the apparatus.

20. The apparatus of claim 19, further comprising:

wherein the response is transmitted as an omnidirectional transmission.

21. A computer program product comprising computer executable program code recorded on a computer readable, non-transitory storage medium, the computer executable program code, when executed by a computer processor, comprising:

code for receiving by an apparatus, a wireless message from a sending device, including at least one condition for response from the apparatus, the condition for response including receive power of the wireless message at the apparatus, service level of the apparatus, and MAC address of the apparatus and that the apparatus can respond with a selected response, wherein the wireless message is a probe request;

code for determining by the apparatus that it can satisfy the at least one condition; and code for transmitting a response by the apparatus.

* * * * *